Figure 1:
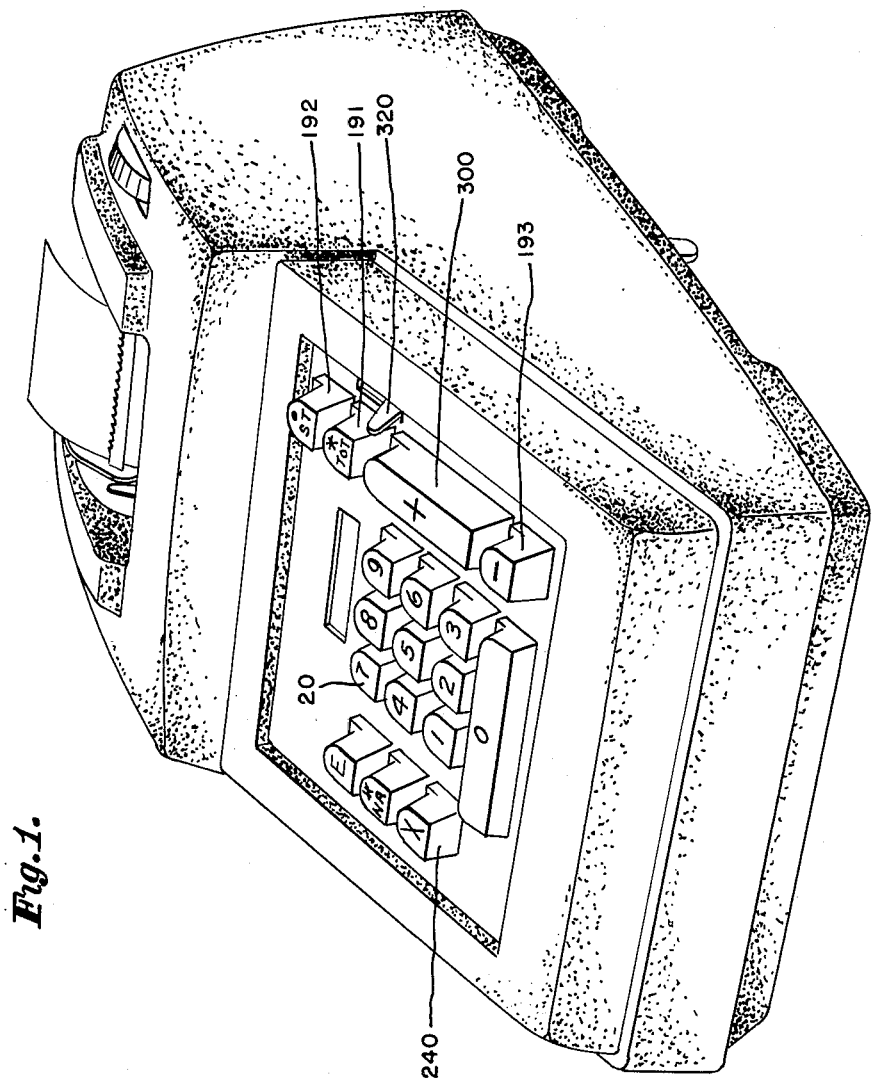

Oct. 9, 1962 R. C. AMMON 3,057,550
TEN KEY CALCULATING MACHINE
Filed March 3, 1960 13 Sheets-Sheet 1

INVENTOR.
RICHARD C. AMMON
BY Gordon R. Santoru

AGENT

Fig. 2.

Oct. 9, 1962  R. C. AMMON  3,057,550
TEN KEY CALCULATING MACHINE
Filed March 3, 1960  13 Sheets-Sheet 3

INVENTOR.
RICHARD C. AMMON
BY Gordon R. Sanborn
AGENT

Oct. 9, 1962    R. C. AMMON    3,057,550
TEN KEY CALCULATING MACHINE
Filed March 3, 1960    13 Sheets-Sheet 5

Oct. 9, 1962 R. C. AMMON 3,057,550
TEN KEY CALCULATING MACHINE
Filed March 3, 1960 13 Sheets-Sheet 7

Oct. 9, 1962 R. C. AMMON 3,057,550
TEN KEY CALCULATING MACHINE
Filed March 3, 1960 13 Sheets-Sheet 8

Oct. 9, 1962 R. C. AMMON 3,057,550
TEN KEY CALCULATING MACHINE
Filed March 3, 1960 13 Sheets-Sheet 13

United States Patent Office 3,057,550
Patented Oct. 9, 1962

3,057,550
TEN KEY CALCULATING MACHINE
Richard C. Ammon, Detroit, Mich., assignor to Burroughs Corporation, Detroit, Mich., a corporation of Michigan
Filed Mar. 3, 1960, Ser. No. 12,622
13 Claims. (Cl. 235—60)

The present invention relates to calculating machines having a pin carriage displaceable from a home position in response to the operation of numerical keys and more particularly to means for initiating a total-taking cycle of operation in such machines while the carriage is displaced from its home position.

In calculating machines of the type disclosed herein a plurality of numerical keys are each operable to cause escapement of a mechanism such as the well-known pin carriage in stepwise fashion away from home position and to move a settable element such as a pin therein from a first to a second position. The displaced pins then serve to limit the movement of the amount actuators or add racks during an amount entering cycle of operation. During a first portion of such an amount entering cycle the actuators or geared racks are held out of engagement with the totalizer and hence move to positions limited by the displaced pins in the pin carriage. During a second portion of an amount entering cycle of operation the totalizer is engaged with the actuators and therefore as the actuators are driven to their initial positions the amount previously entered into the pin carriage is transferred to the totalizer. Near the end of the machine cycle means driven by the power section serves to return the pin carriage to home position and simultaneously restore each of the pins to their first positions. During a total-taking operation the actuators are engaged with the totalizer during the first portion of the machine cycle and are then urged to positions determined by the pinions or wheels in the totalizer, said pinions being rotatable until they reach their zero positions. During such a total-taking cycle of operation it is essential that the actuators be limited by the totalizer and not by the pins of the pin carriage and therefore means such as a pin carriage-totaling interlock has usually been provided for preventing operation of the total and subtotal keys if the pin carriage is not in its home position. An interlock between the pin carriage and the totaling keys serves a further purpose in that amounts entered into the carriage cannot be accidentally destroyed by the operation of a totaling key prior to transfer of the amount from the pin carriage to the totalizer.

Ten key calculating machines are usually provided with a repeat key which is operative to disable the carriage restoring mechanism so that the repeated cycling of the machine will cause the amount in the pin carriage to be repeatedly transferred to the totalizer. At the end of a cycle of operation initiated by the repeat key the pin carriage is displaced from its home position and therefore the pin carriage-totaling interlock prevents operation of the total or subtotal keys. Thus a blank machine cycle, usually initiated by the operation of an error key, must be performed to restore the pin carriage to home position and thereby release the totaling keys for operation.

Accordingly, it is an object of the present invention to provide a ten key calculating machine in which a total-taking cycle of operation can be initiated immediately following a cycle of operation caused by the operation of a repeat key.

A further object of the present invention is to provide a ten key calculating machine in which the total and subtotal keys are blocked against operation when an amount is entered into the pin carriage and in which the total and subtotal keys are released for operation by the depression of a repeat key. Another object of this invention is to provide means for restoring the pins in the pin carriage of a ten key machine early in each machine cycle initiated by the total and subtotal keys. A further object is to provide a ten key calculating machine having a control key for initiating an amount entering cycle of operation and including means responsive to the operation of a repeat key to cause the machine to perform a total-taking operation in response to the operation of said control key immediately following operation of the repeat key.

Figure 3:
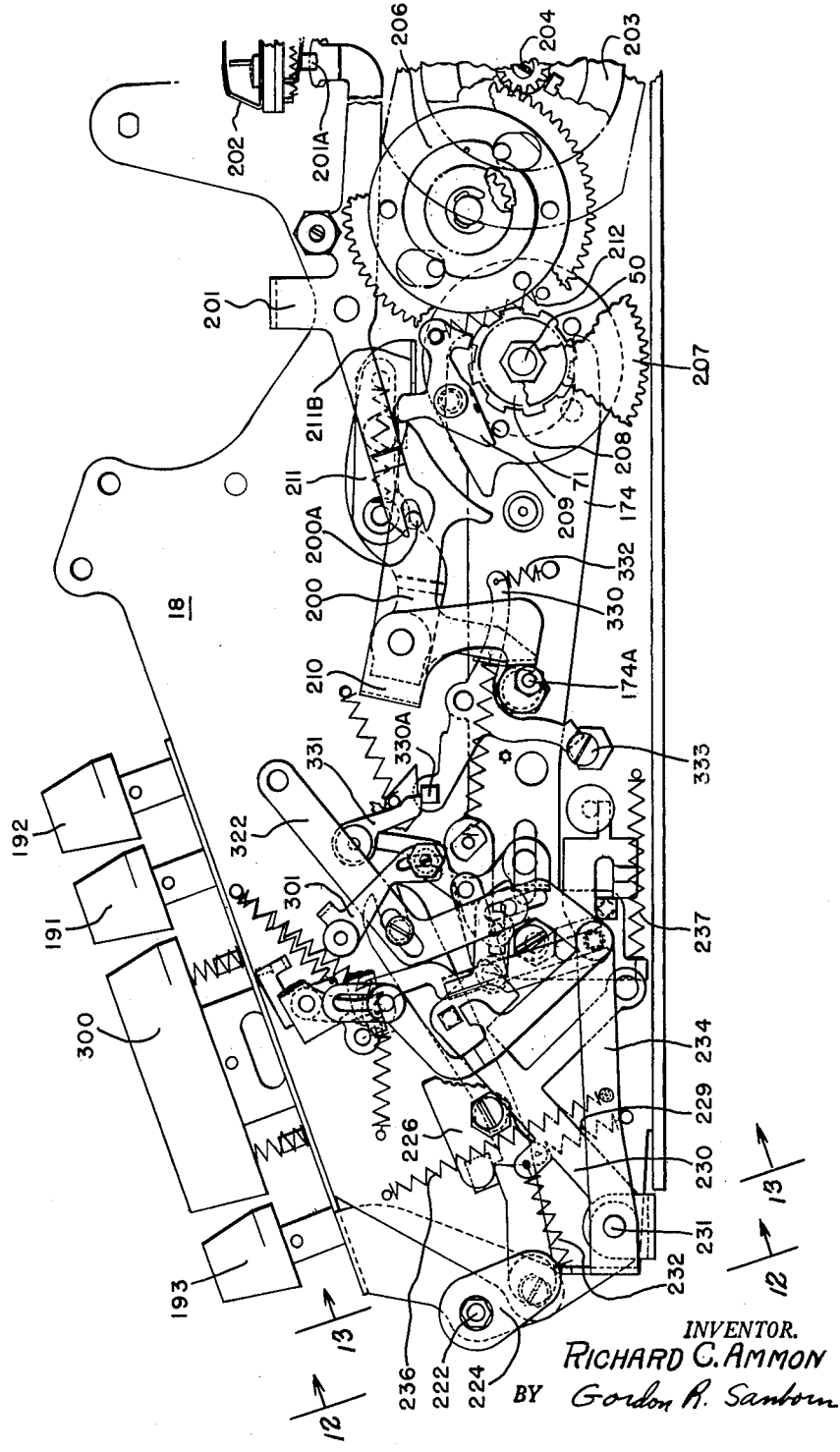
Figure 4:
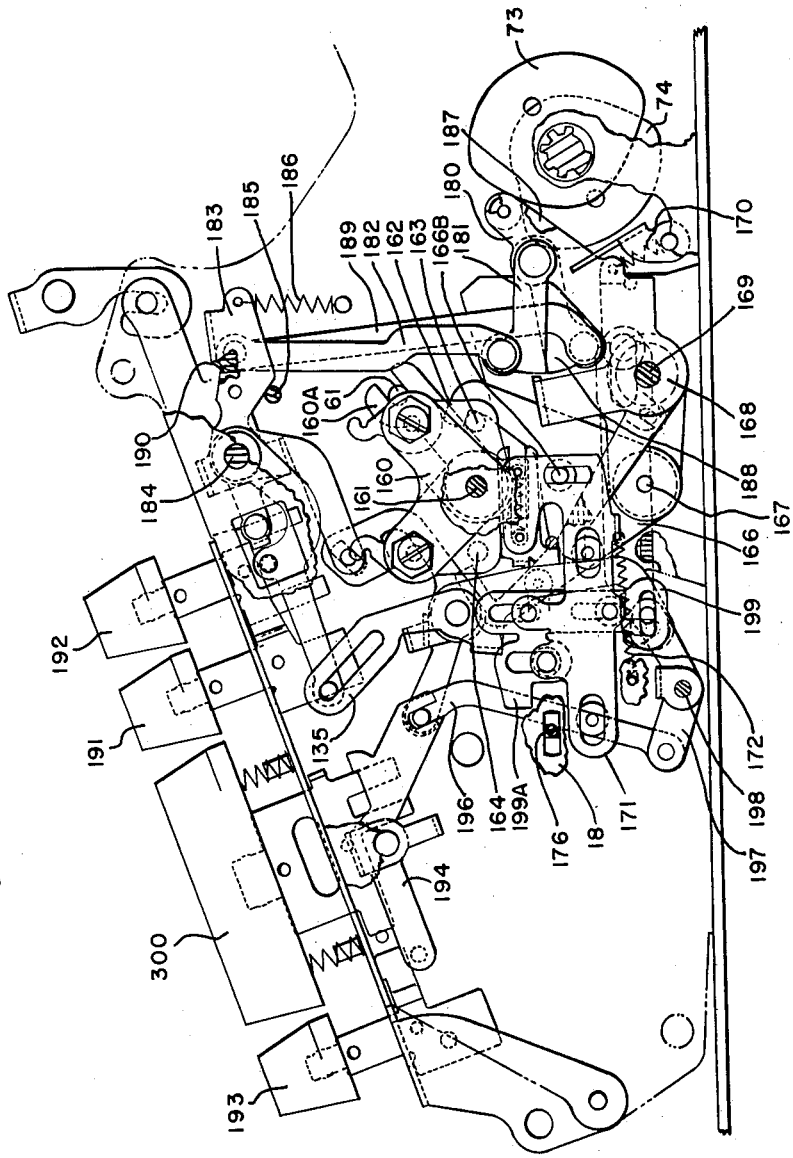
Figure 5:
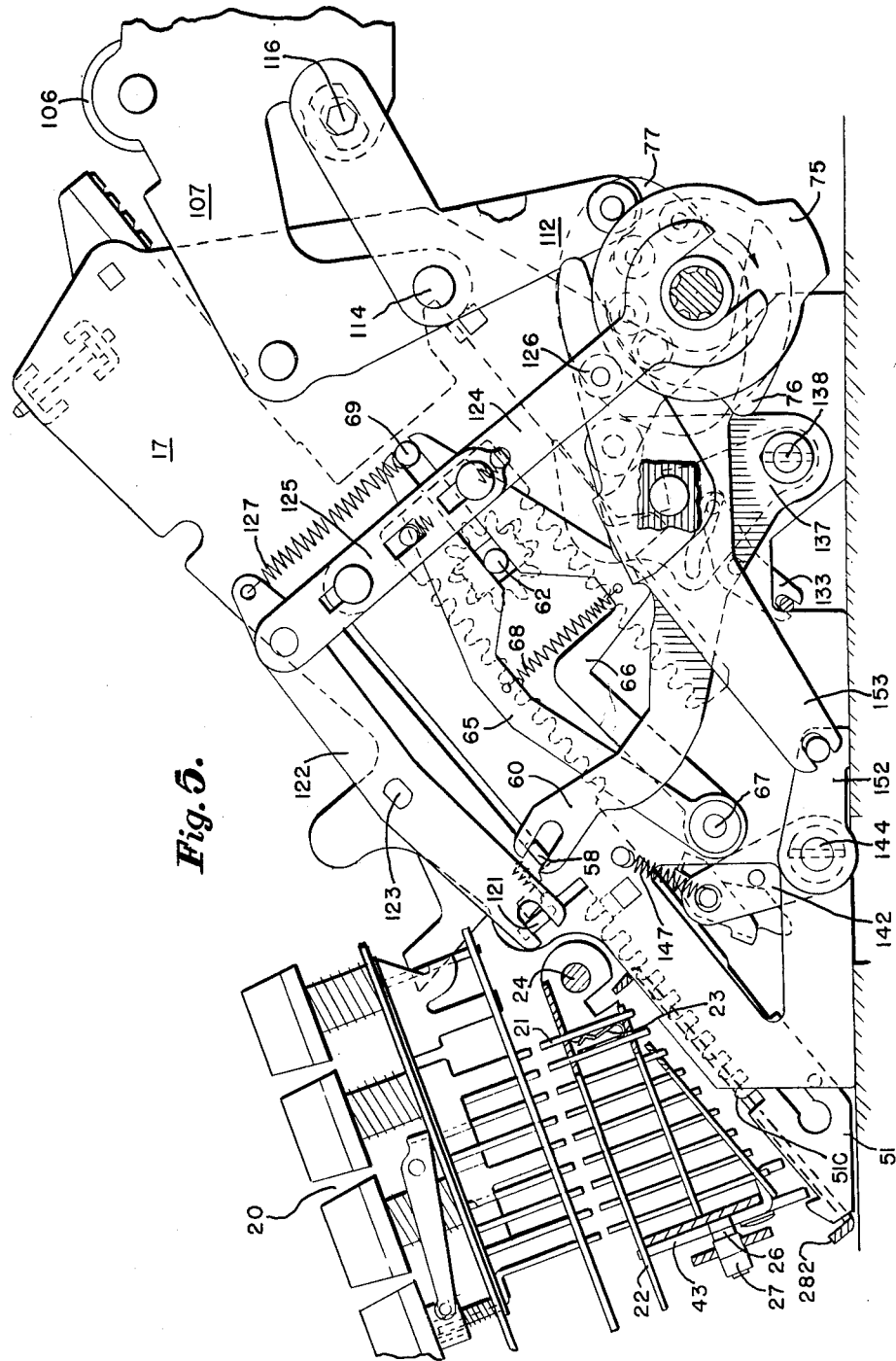
Figure 6:
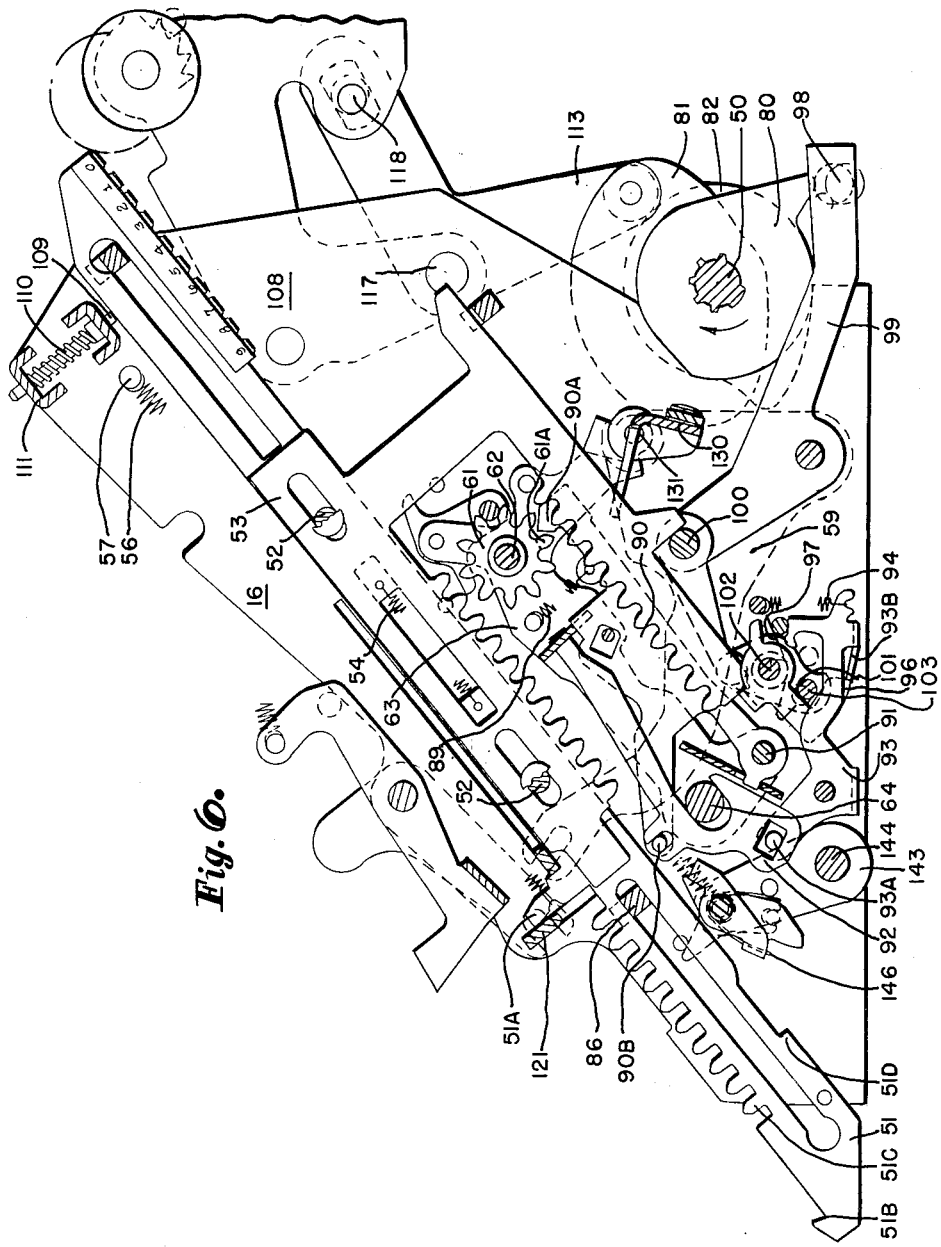
Figure 7A:
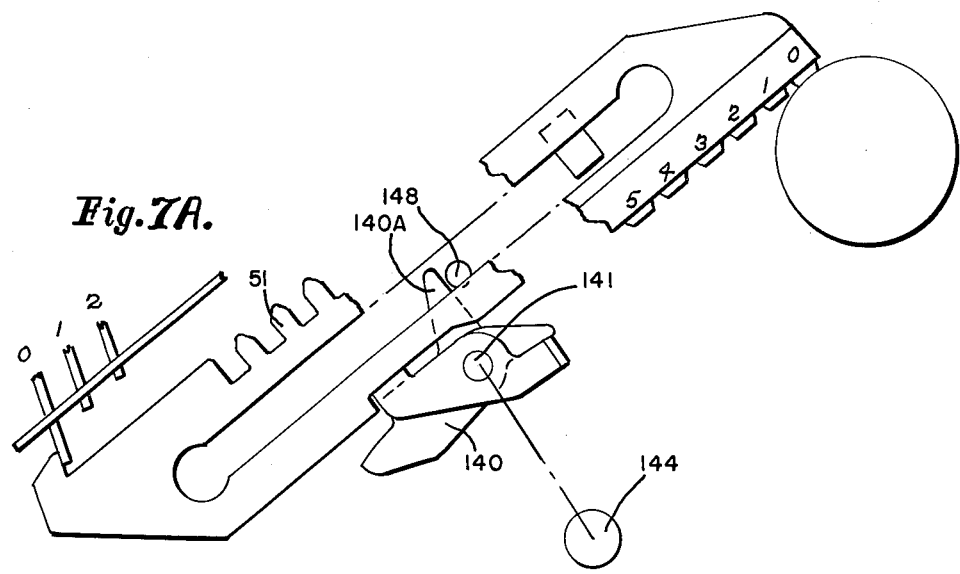
Figure 7B:
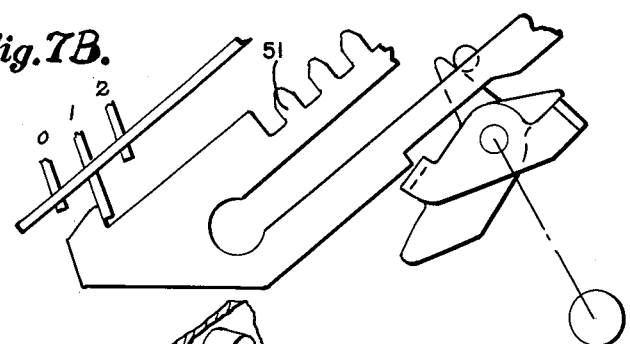
Figure 7C:
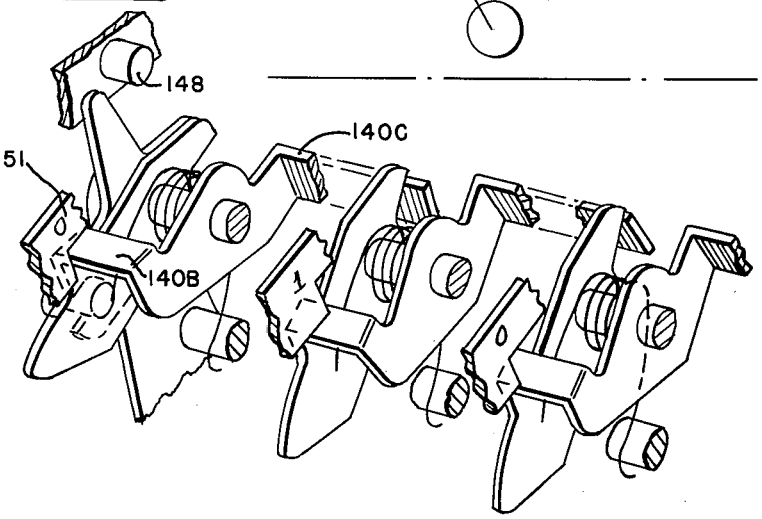
Figure 8:
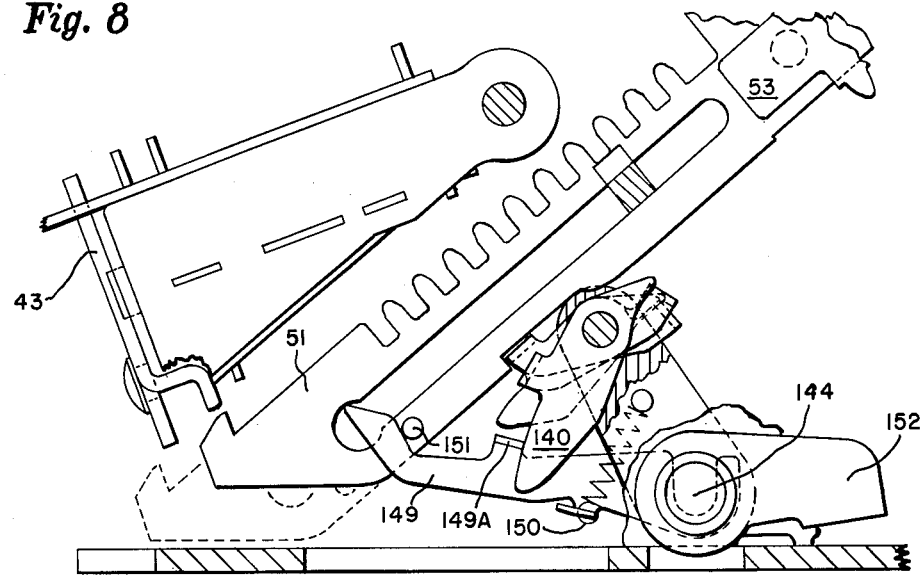
Figure 9:
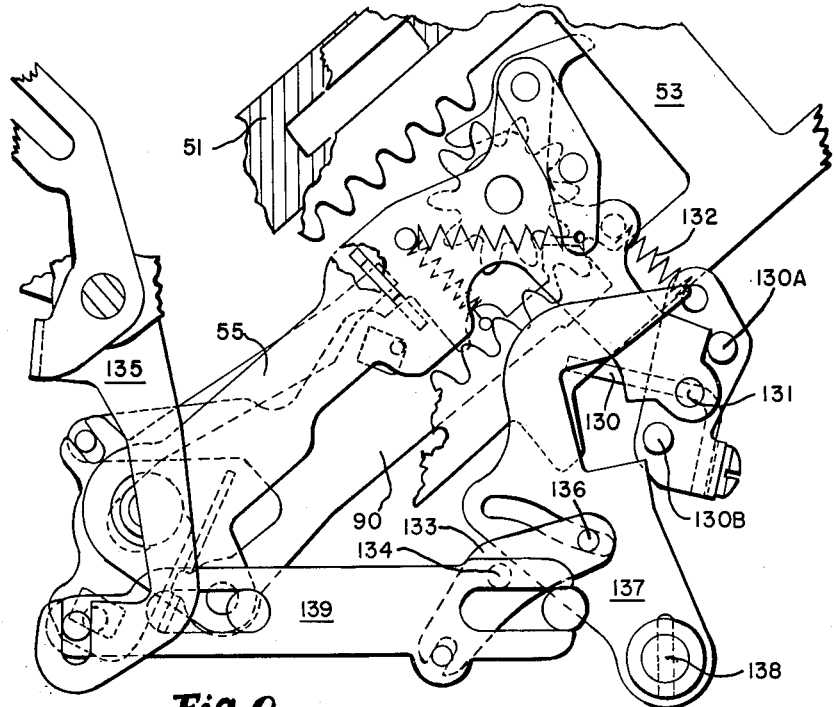
Figure 10:
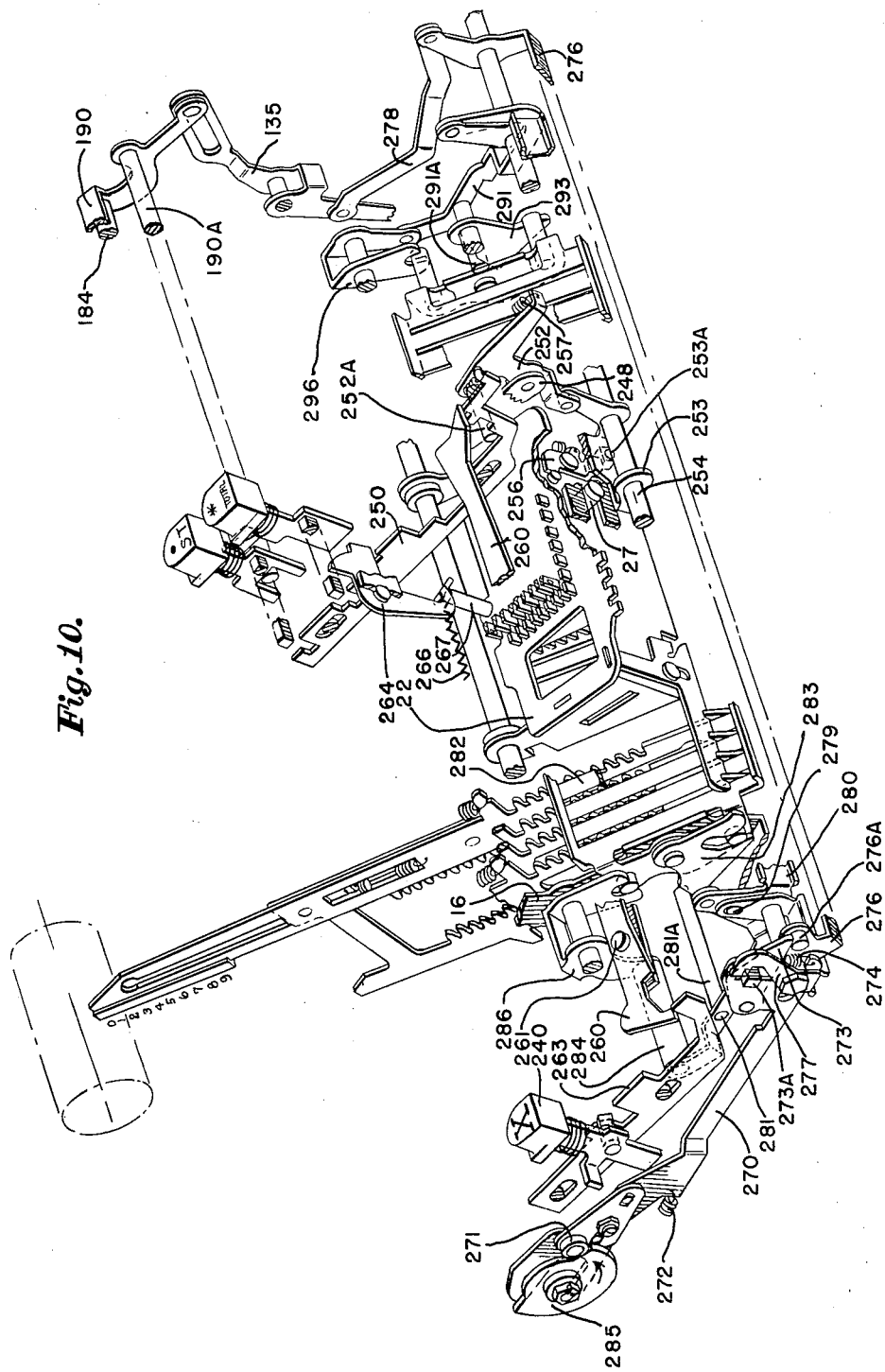
Figure 11:
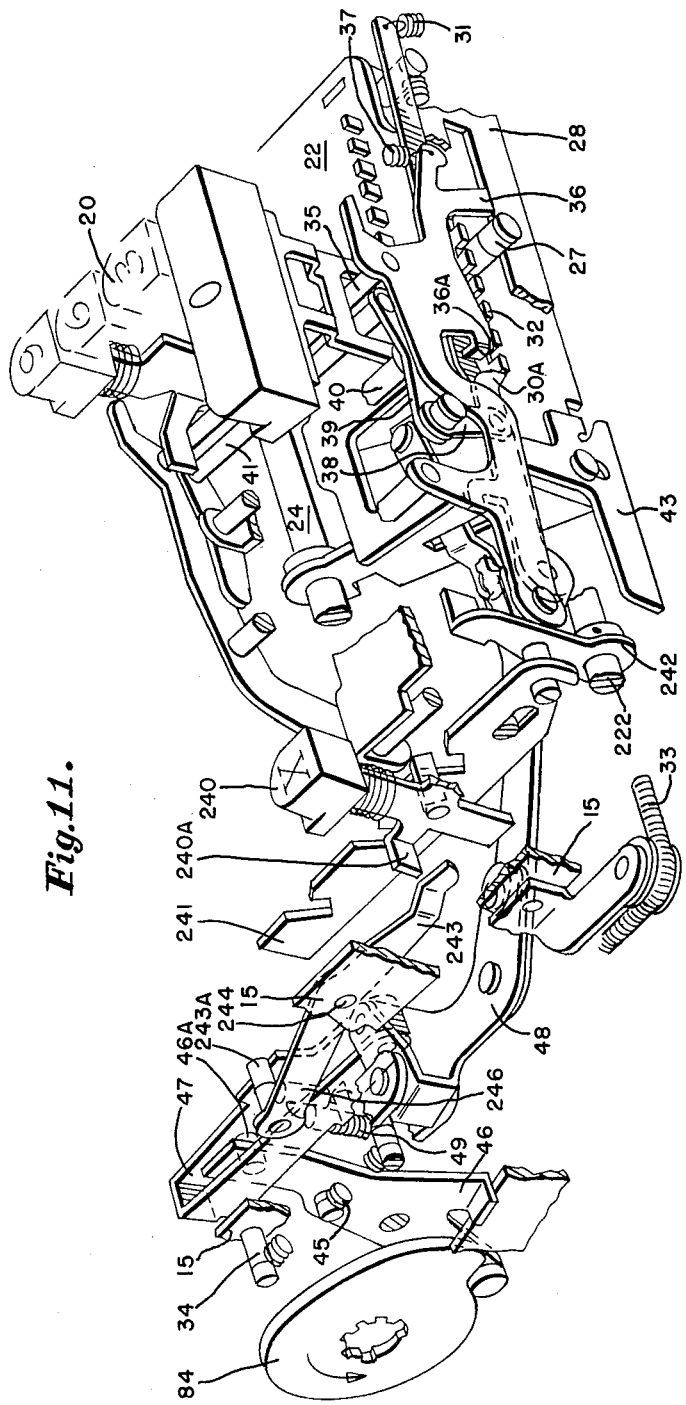
Figure 12:
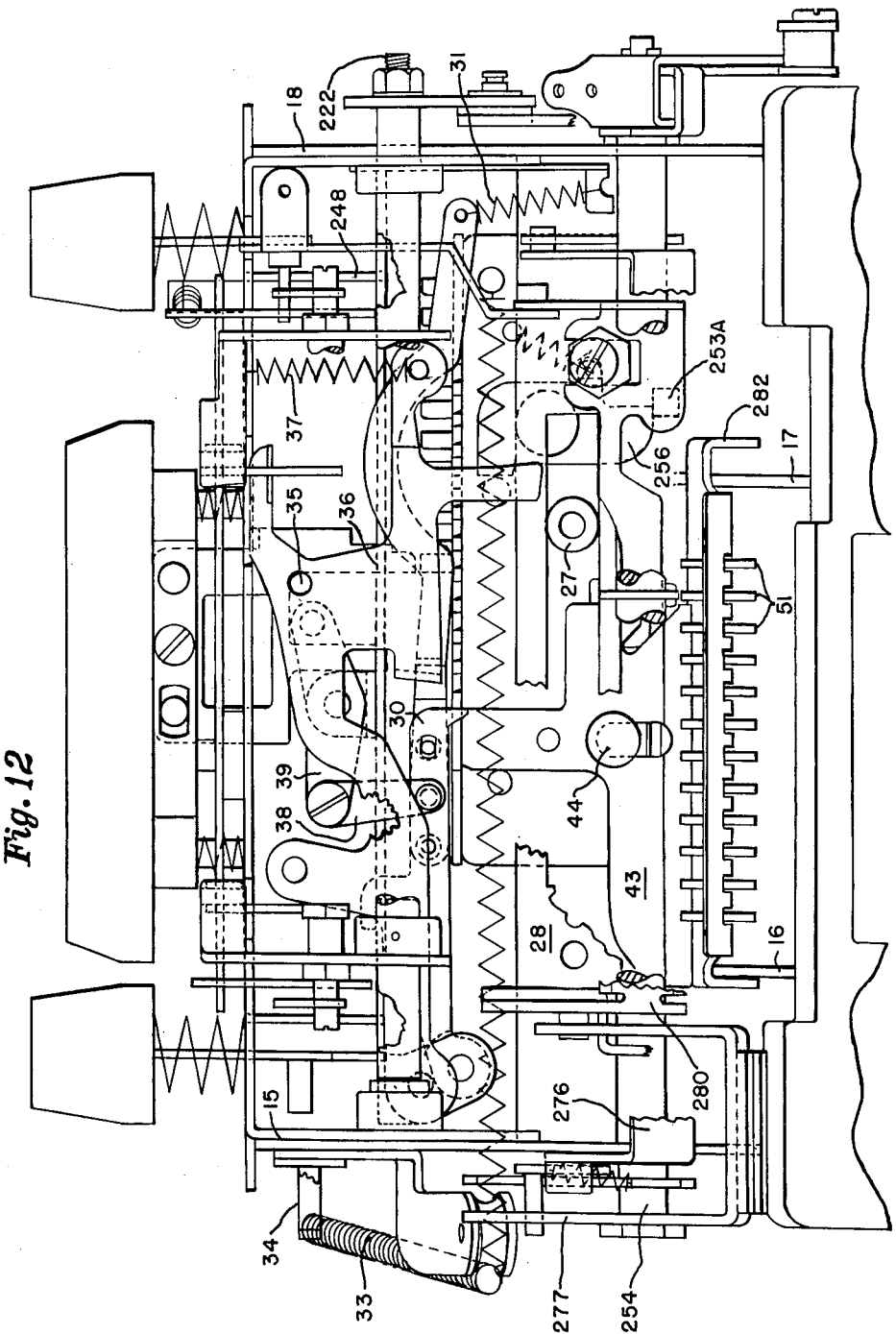
Figure 13:
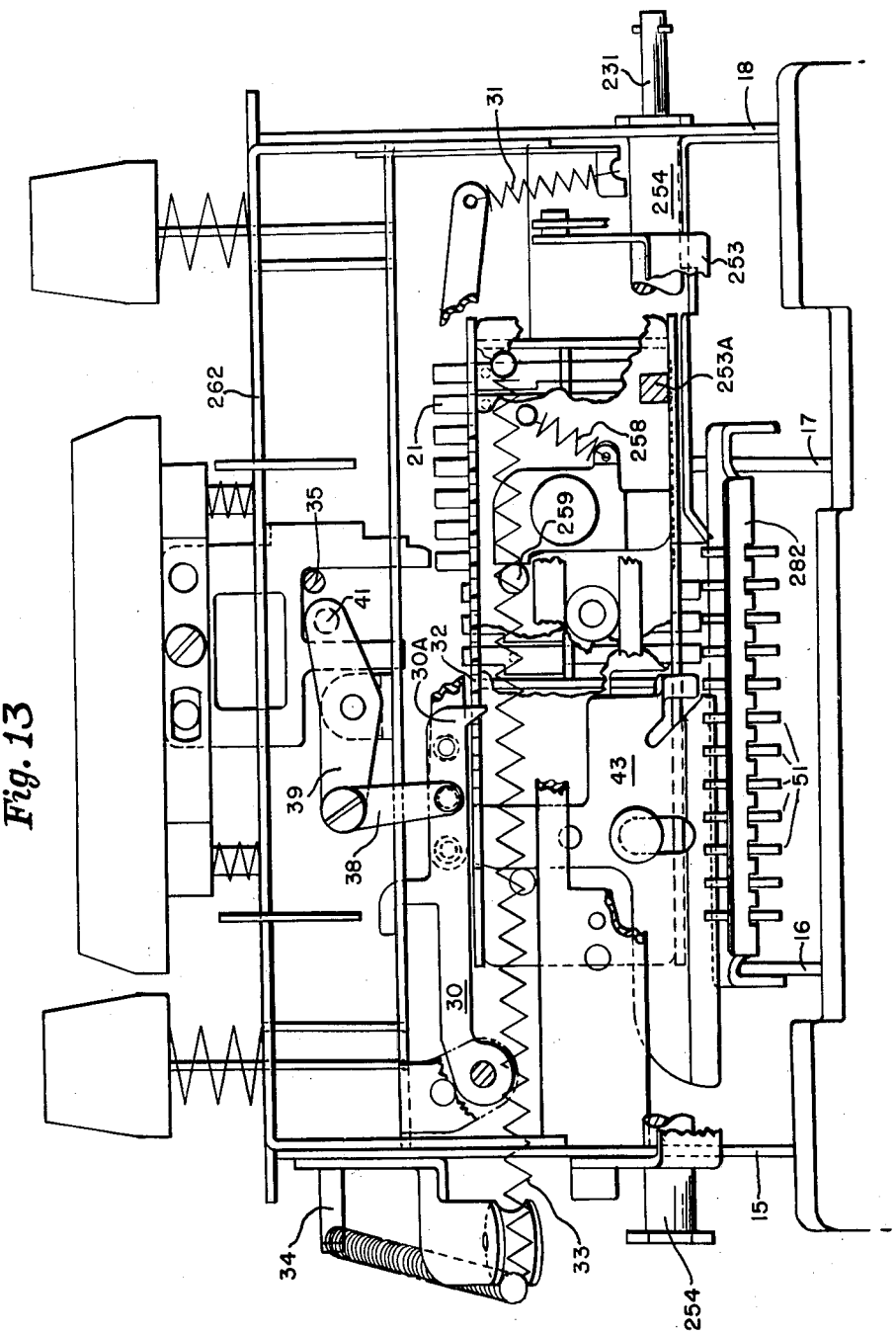
Figure 14:
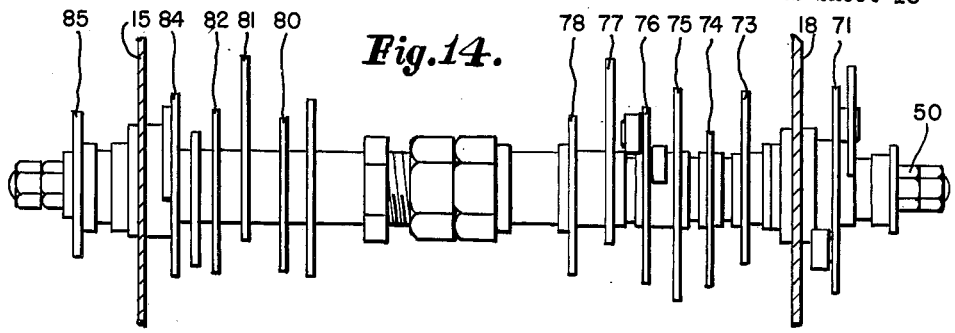
Figure 15:
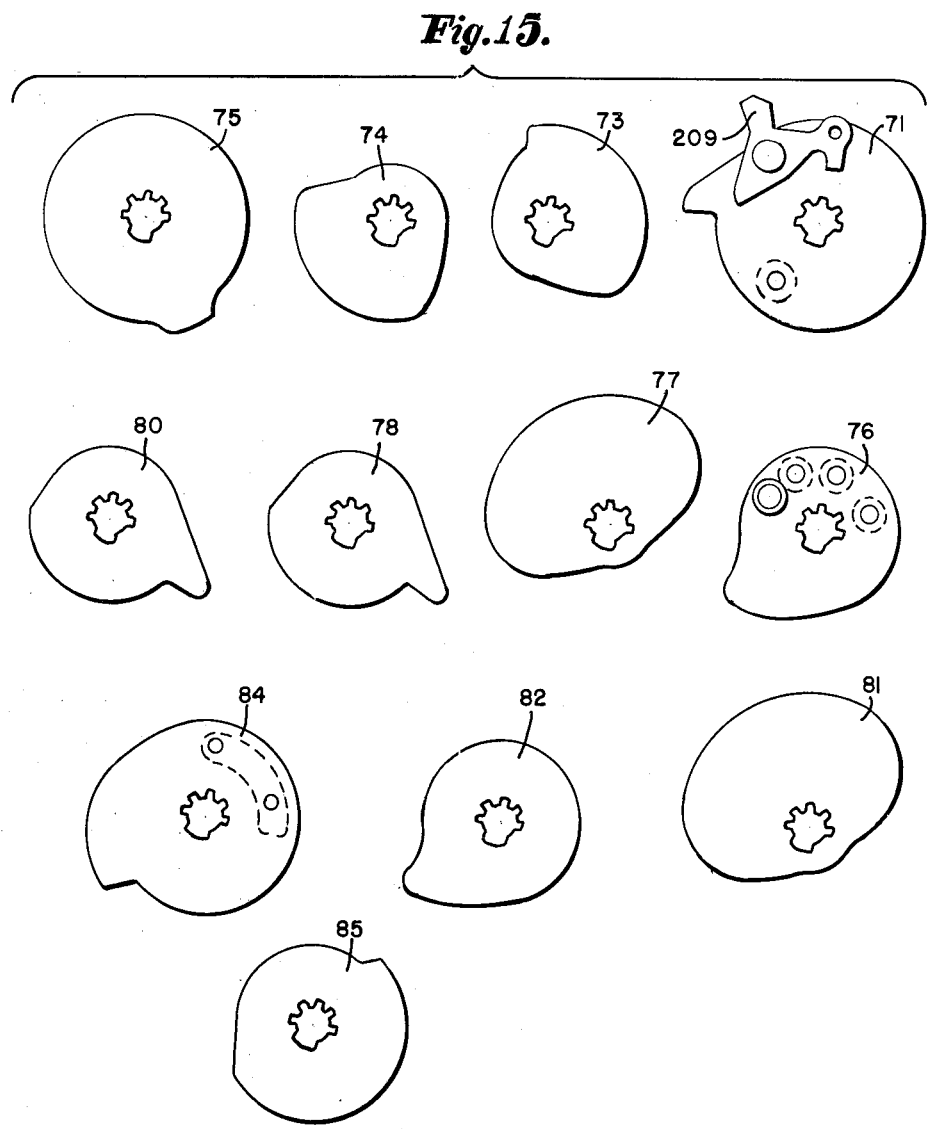

These and other objects of the present invention are set forth in the appended claims but the invention itself as well as additional advantages and objects thereof will be more clearly understood from the following description when read in connection with the accompanying drawings in which like parts are identified by the same reference numbers throughout the various figures and in which, FIG. 1 is a perspective view of the machine shown for purposes of illustration as incorporating the improvements of the present invention, FIG. 2 is a perspective view from the right front corner of the machine with the cover removed showing the cycle initiating mechanism with some of the parts separated to more clearly show their manner of operation, FIG. 3 is a right elevation showing the cycle initiating and drive mechanism, FIG. 4 is a right elevation showing the parts carried on a stationary frame for controlling the engagement of the totalizer with the add racks, FIG. 5 is an elevation from the right inside the outer machine frames showing the printing mechanism and the devices for controlling the movement of the print bars and add racks, FIG. 6 is a section through the machine seen from the right showing the various parts of the totalizer, FIGS. 7A, 7B and 7C are illustrations of the devices used to prevent printing of ciphers to the left of the highest number entered in an amount entering operation, FIG. 8 is a right elevation of the cipher suppression mechanism for the second or tens order of the machine, FIG. 9 is a view from the right showing the mechanism on the right end of the totalizer which serves to move the totalizer in one direction for an add operation and in another direction for a subtract operation, FIG. 10 is a perspective view of the various parts associated with the pin carriage controlled mechanism which blocks the total and subtotal keys against operation, FIG. 11 is a perspective view of the pin carriage escapement and restoring mechanism, FIG. 12 is an elevation of the intermediate keyboard and escapement mechanism along lines 12—12 of FIG. 3, FIG. 13 is an elevation along lines 13—13 of FIG. 3 illustrating the manner of control of the total and subtotal blocking means, FIG. 14 is a front view of the main driveshaft with the driving cams thereon, and FIG. 15 is a detail drawing of several of the cams secured to the main driveshaft.

To facilitate the description of the drawings now to be referred to the terms top and bottom, front and rear, left and right, and clockwise and counterclockwise will be used with reference to the machine as viewed from the front, above, or from the right-hand side.

GENERAL DESCRIPTION

The machine is provided with ten numerical keys and a pin carriage having a plurality of columns of pins disposed therein which are movable from first to second positions in response to depression of a numerical key, said pin carriage being adapted to escape one columnar position to the left in response to the depression of a numerical key. Thus an entire amount is entered into the pin carriage through the successive operation of numerical keys starting with the highest order digit in the number. Thereafter the appropriate operation control key, usually the add or the subtract key, is operated to establish the necessary connections within the machine to cause the performance of the desired arithmetic function and to complete the circuit for an electric motor which is adapted to drive the machine through cycles of operation. The driving connection which couples the motor with the main driveshaft of the machine includes a one-cycle mechanism normally effective to disconnect the motor from the machine main driveshaft and to open the motor circuit after a single cycle of operation.

During an addition or a subtraction operation the rotation of the main driveshaft is effective through cam means secured thereto to control the movement of a bail which in turn controls the movement of the plurality of amount actuators (or add racks) mounted on the print bars. During the first half of an amount entering cycle of operation the amount actuators move to differential positions under the urge of springs with the pins in the pin carriage serving to limit the amount of travel of the actuators and print bars. After the print bars and actuators have reached their differential numerical representing positions the platen of the machine is moved into engagement with the print fonts on the print bars to effect printing. During such rearward travel of the amount actuators during a first portion of the machine cycle the totalizer is maintained disengaged from the amount actuators, and then before the actuators and print bars are driven back to their initial positions the totalizer is engaged therewith. Hence the amount is transferred from the amount actuators to the totalizer during a second portion of the cycle. The home position of the print bars is one unit forward of the zero position of the actuators, with said actuators being mounted on the print bars for relative movement to accomplish tens transfers near the end of the machine cycle. The actuators themselves are in the form of geared add racks each of which has an upper and a lower section. If the pinions in the totalizer are engaged with the lower section of the actuators as the actuators are driven to their home positions the amount is entered additively while engagement of the totalizer pinions with the upper geared sections of the actuators causes the pinions to be rotated in a counterclockwise or subtractive direction. Near the end of each amount-entering cycle after the print bars have been restored to their initial positions the power section of the machine is effective to drive the pin carriage to the right to its home position. As the pin carriage is being driven toward home position a cam plate is effective to engage each pin which has been moved from its first to its second position in response to the operation of a numerical key, and is thereby effective to restore each pin to its first or initial position.

During a total-taking cycle of operation the totalizer is engaged with the amount actuators during the early portion of a machine cycle and then the amount actuators are released for movement to differential positions limited by the totalizer, such limiting occurring when the wide tooth on the individual pinions engages the respective tens transfer mechanism which during a totaling operation is prevented from undergoing tens transfer movement. After the amount in the totalizer has been backed off during the first half of the cycle the totalizer is disengaged from the actuators so that each of the pinions in the totalizer stands at zero position. During a total operation the actuators are maintained disengaged from the pinions during the second half of the cycle so that the pinions remain at zero position while during a subtotal operation the pinions remain engaged with the actuators during the second half cycle and hence the amount is re-entered into the totalizer as the actuators are driven to their home positions. Since the actuators must be limited by the totalizer during a total-taking operation and not by the pins an interlock is provided between the pin carriage and the total-taking keys which is effective to block the total and subtotal keys against operation as soon as the carriage undergoes an initial escapement from home position. The interlock also avoids the possibility of an operator entering an amount in the carriage and then operating the total or subtotal key before the amount is transferred to the totalizer.

The machine is provided with a repeat key which is effective to cause repeated cycling of the machine as long as it is held depressed, and is further effective to disable the carriage restoring means so that the amount in the pin carriage can be repeatedly entered into the totalizer. When th repeat key alone is depressed the amount is entered additively, and if the repeat and subtract keys are depressed simultaneously the amount will be repeatedly subtracted. At the end of a machine cycle initiated by the repeat key the pin carriage remains displaced from home position and therefore the total and subtotal keys would normally be locked. In the present machine a power-driven pin restoring mechanism is operative in response to operation of the total and subtotal keys to restore the pins early in the total-taking cycle of operation before the amount actuators have moved to positions where they would engage the pins of the pin carriage. The repeat key can thus be effective to not only disable the carriage restoring means but also to disable the interlock between the carriage and the totaling keys and therefore a total or subtotal can be taken following a repeat operation without the performance of an additional cycle to restore the carriage to home position. Thus an amount entered into the carriage will not be erroneously destroyed through the operation of the total or subtotal keys before the amount is entered into the totalizer since the interlock will normally prevent operation of the total and subtotal keys unless the carriage is in home position, but when an amount has been entered into the totalizer through the use of the repeat key a total or a subtotal can be taken directly without the need for an additional machine cycle.

The machine is further provided with a level having a first position in which it is effective to cause a total-taking cycle of operation to be performed in response to operation of the add key when the carriage is in its home position and to cause an amount-entering operation when the add key is operated with the carriage displaced from home position. The mechanism controlled by this lever is further coupled with a carriage-keyboard interlock in a manner such that if the lever is in its first position following operation of the repeat key the release of the interlock will render the lever-controlled mechanism operative to cause a total-taking operation when the add key is depressed with the carriage still displaced from home position. Thus an operator has the advantage of being able to use a single motor bar to enter amounts and to obtain totals.

AMOUNT ENTERING

The machine has four stationary frames 15, 16, 17, 18 which serve to support the various parts in the machine. As seen in FIGS. 5 and 10 each of the numerical keys 20 except the number 9 key has its keystem offset with the lower ends arranged in a line so that when a numerical key is depressed it will move a pin 21 supported in the pin carriage 22 from a first to a second position. As explained hereinafter, the pins operated by the keys serve to control the rearward travel of print bars carrying add racks thereon from home positions to differential positions. In the present machine the full amount of rearward travel which a rack can undergo corresponds to nine units of movement and therefore the nine key does not serve to displace a pin in the carriage. The print bars are normally held one unit in front of the zero position of the add racks and thus the zero key is effective to move a pin in the carriage to serve as a zero limit for the associated bar. As seen in FIG. 5 each of the pins in a given column is of a different length to accommodate the angular relationship of the keyboard with respect to the add racks. Each pin is controlled by small springs 23 which engage an abutment on the associated pins to yieldingly hold it either in its upper or its lowered position. The pin carriage 22 is slidingly carried along its rear edge by shaft 24 which is supported by stationary frames 15 and 18, while stud 26 extending forward from the front of the carriage carries a roller 27 which rides in a slotted stationary guide frame 28 (FIG. 11). Thus the carriage is movable from right to left under the control of the escapement mechanism illustrated in FIGS. 11, 12 and 13.

A first escapement pawl 30 (FIGS. 11, 12) pivoted at its left end on a stationary bracket is urged clockwise by a spring 31 to maintain a downwardly extending nose 30A in engagement with one of the lugs 32 on the carriage 22. Thus the escapement pawl 30 is normally effective to hold the pin carriage against the leftward urge of a spring 33 which is connected to the carriage and to a stud 34 extending to the left from frame 15. A second escapement pawl 36 similarly pivoted at its left end is urged counterclockwise by a spring 37 in a manner such that its rearwardly extending lug 36A is normally maintained above the lugs 32 on the pin carriage.

A link 38 connects the pawl 30 with a lever 39 pivoted on a shaft 40, said lever 39 carrying a rearwardly extending shaft 41 which underlies a portion of each of the ten keystems. When a numerical key is depressed the lever 39 will be rocked clockwise and thus link 38 will pull pawl 30 counterclockwise so that the nose 30A releases the pin carriage for movement to the left. The pawl 36 also carries a rearwardly extending shaft 35 which is positioned beneath the ten numerical keystems so that when a numerical key is depressed the pawl 36 will be moved clockwise to bring its lug 36A into the space between adjacent lugs 32 on the upper pin carriage plate. As seen in FIG. 11 the shafts 35 and 41 are supported at their rear ends by suitable pivoting levers so that each shaft will undergo a uniform translation when a key is depressed. As best seen in FIGS. 12 and 13 the shaft 35 is normally higher than shaft 41 so that when a numerical key is depressed the pawl 36 will be lowered before the pawl 30 is elevated. Therefore the lug 36A will be in a position to be engaged by a lug 32 when the nose 30A is released from the adjacent lug 32 as the key is being depressed. When the depressed numerical key is released the shaft 41 will be released prior to the shaft 35 and hence the spring 31 will urge the nose 30A downward into engagement with the top on the lug 32 with which the nose 30A was previously engaged. When the lug 36A moves upward as a result of further upward travel of the numerical key the carriage will be released for the completion of its leftward step, at which time the nose 30A will move down to engage the adjacent lug 32. In this manner the carriage moves in a stepwise fashion from its right-hand home position in response to the operation of each of the ten numerical keys. It should be noted that as seen in FIG. 5 each of the numerical keys 0-8 is effective upon operation to displace a pin 21 from its first to its second position while the nine key merely serves to cause escapement of the pin carriage.

The machine is driven through cycles of operation by means of an electric motor which is operative to rotate a main driveshaft 50 through one complete revolution as will be described hereinafter. Power for restoring the pin carriage to home position is thus derived from a cam 84 on the main driveshaft 50 (FIG. 11) which is in engagement with a roller on the lower end of a lever 46 pivoted on the right side of the left stationary frame 15. The upper end of lever 46 is disposed within the U-shaped portion of a second lever 47 carried by the carriage restoring arm 48 which is pivoted on a small bracket extending to the left from frame 15. The arm 48 has a rightwardly extending portion coupled with the pin carriage 22 and therefore if the arm 48 is driven in a counterclockwise direction the pin carriage 22 is restored to home position. A spring 49 connected to the lever 47 and to a stud extending to the right from frame 15 serves to hold the lever 47 in engagement with the rightwardly extending stud 46A on the lever 46 while a second spring 45 connected to the same stationary stud on frame 15 is connected to a leftwardly extending stud on lever 46 to hold the roller on the lower end of lever 46 in engagement with the cam 84. The shape of the cam 84 is such that near the end of each machine cycle the lever 46 is driven clockwise so that its upper end will pull the lever 47 rearward and thereby rotate the carriage restoring arm 48 counterclockwise for restoring the pin carriage to home position.

During an amount entering cycle of operation the rotation of driveshaft 50 operating through cams serves to control the rearward travel of a plurality of print bars 51 (FIGS. 6) each of which has a pair of pins 52 extending to the right to carry on its right side an amount actuator or add rack 53. The pins 52 pass through elongated slots in the racks, with springs 54 serving to constantly urge the racks forward on the print bars. Each print bar 51 has an upstanding lug 51A to which a spring 56 is connected, the other end of said spring 56 being secured to a stationary shaft 57 so that the print bar is constantly urged rearward. A cross bar 58 carried by a pair of arms 59 and 60 controlled by cams 77 and 81 is engaged with each of the lugs 51A and serves to control the time and direction of movement of the bars 51. Cams 77 and 81 on the drive shaft 50 are so shaped that the bar 58 moves rearward during the first half of each cycle to allow the springs 56 to pull the print bars and add racks to differential positions limited by the pins in the carriage, and then during the second half of a cycle the bar 58 moves to its forward position to restore the print bars and add racks to their home positions.

Each of the add racks or amount actuators 53 has an upper and a lower geared surface adapted to engage the pinions 61 of the totalizer. The pinions 61 are mounted on a shaft 62 carried by the totalizer frames 63 and 55 pivoted on a shaft 64 extending between the stationary frames 16 and 17. Normally the pinions are held between the two geared sections of the add racks by means of the two levers 65 and 66 (FIG. 5) pivoted on the stud 67 protruding to the right from the frame 17. A heavy spring 68 urges the levers 65 and 66 into engagement with the stationary stud 69 and therefore since the end of the totalizer shaft 62 is positioned between the flat portions of the two levers the totalizer is normally maintained in the position shown in FIG. 6.

During the first half of an amount entering cycle of operation as the cross bar 58 moves rearward the springs 56 urge the print bars 51 rearward until the noses 51B on the print bars engage the bottom ends of pins 21 which have been moved from first to second positions. A plate 43 seen in FIGS. 5, 11 and 12 is carried on the front of the pin carriage by means of a stud 44 which passes through a vertical slot in the plate, the upper end of the plate 43 passing through an opening in the top plate of the pin carriage so that the plate 43 is movable with respect to the pin carriage. Normally the plate 43 is held in its lowermost position as seen in FIGS. 5, 11 and 12 with its lower edge disposed in the path of the noses 51B of the print bars. When the pin carriage is in its home position the plate 43 is in the position illustrated in FIG. 12 where it serves to hold the numerical print bars one step forward of the zero pins 21 in the pin carriage. As an amount is entered into the pin carriage by the successive depression of numerical keys the pin carriage and hence the plate 43 steps to the left so that the right end of the plate 43 moves beyond the print bars associated with those columns of pins having a pin depresesd therein. Therefore the print bars to the left of the highest order digit in the amount to be entered into the totalizer are held against rearward travel by the plate 43 while the print bars associated with those columns in the pin carriage having a pin depressed are allowed to move rearward to differential positions limited by the pins. During such rearward travel of the print bars and hence of the amount actuators or add racks 53 during an amount entering cycle the totalizer remains disengaged from the add racks.

During the second portion of an amount entering cycle of operation the totalizer pinions 61 are engaged either with the upper geared sections of the add racks for subtraction or with the lower geared sections for addition so that as the bar 58 is driven forward by the main driveshaft the amount represented by the differential movement of the amount actuators during their rearward travel will be transferred to the totalizer. When the print bars reach a forward position where the noses 51B are in alignment with the zero pins 21 in the carriage the add racks 53 are stopped and therefore as the print bars 51 continue their forward movement under the drive of the bar 58 the springs 54 which connect the add racks 53 and the print bars 51 will be energized. Thus the add racks 53 will normally be subjected to a forward urge on the pins 52 and therefore since the print bars 51 move slightly more than one unit beyond the stopping point of the add racks the add racks can under proper conditions undergo an additional step of forward movement to accomplish tens transfers.

TENS TRANSFERS

A comb 86 disposed in the path of the add racks in front of their forward ends (FIG. 6) serves to guide the print bars and also to limit the add racks to a single unit of forward movement on the print bars during a tens transfer. The tens transfer mechanism (FIG. 6) moves with the pinions as they are engaged with either the upper or the lower geared sections of the add racks and thus the same mechanism is used to control tens transfers during addition and subtraction. Each pinion is provided with a wide tooth 61A which is effective to initiate a tens transfer in a well-known manner by engaging the spear-shaped point 90A of a carry pawl 90 which as seen in FIG. 6 is urged by a spring 89 counterclockwise on a small shaft 91 carried by the accumulator frames. As the carry pawl 90 is rocked clockwise by the wide tooth its rightwardly extending stud 90B carries a link 92 rearward which in turn through its engagement with a stud 93A on a secondary latch 93 rocks the latch 93 for the adjacent higher order clockwise against the urge of the spring 94 connected to the tail of the latch 93. The secondary latch 93 has a leftwardly extending bent-over portion 93B which normally engages the lower front end of a primary latch 96 to hold the primary latch in a clockwise position where its upper U-shaped portion is engageable by the lower front end of adjacent add rack 53. When the primary latch 96 is released by the secondary latch 93 a small spring 97 rocks the primary latch 96 counterclockwise to permit the add rack to move forward one unit on the print bar, said movement being limited by the engagement of the add rack with the comb 86. Thus one unit will be added or subtracted in the pinion of the adjacent higher order depending upon whether the totalizer is engaged with the lower or the upper geared sections of the add racks. If such adjacent higher order pinion is already in a position where the additional unit entered therein will cause its wide tooth 61A to cam the pawl 90 for the adjacent higher order clockwise a second transfer will occur.

After the tens transfers have taken place the totalizer is disengaged from the add racks and a cam 80 on the main driveshaft 50 comes into engagement with a roller 98 (FIG. 6) carried on the rearwardly extending arm of a lever 99 to pivot the lever clockwise. A cross rod 100 carried by the forward and upwardly extending arm of the lever 99 is therefore driven rearward and through its engagement with the downwardly extending abutments on the add racks will serve to substantially reset the add racks to their normal positions on the print bars. A cam 78 identical to the cam 80 actuates a lever on the right side of the totalizer which is similar to the lever 99 so that the cross rod 100 undergoes a uniform rearward movement for resetting all of the add racks. A link couples the upper end of lever 99 with the upper rear end of a lever 101 supported by the shaft 102 on which the primary latches 96 are supported and therefore when the bar 100 moves rearward the lever 101 is rocked clockwise. A latch resetting shaft 103 carried by the lower front end of the lever 101 thus moves upward into engagement with the primary latches to thereby restore the primary latches to their set positions and allow the springs 94 to rock the secondary latches 93 counterclockwise into latching engagement with the primary latches. The right end of the rod 100 and resetting shaft 103 are controlled in a similar manner by means of the cam 78 acting on a set of levers similar to levers 99 and 101. As previously mentioned the various components of the tens transfer mechanism are carried by the accumulator frames and thus there is no relative movement between the pinions and the transfer pawls 90 except when the wide tooth 61A of a pinion engages the point of a pawl 90 to initiate a tens transfer. Therefore a single set of tens transfer devices for each of the pinions serves to control additive and subtractive tens transfers.

Near the end of the first portion of an amount entering cycle of operation when the print bars have moved rearward to differential positions determined by the pins in the carriage which have been moved from their first to their second positions, a platen 106 carried by levers 107 and 108 is driven toward the print bars to effect printing of the amount on a tape disposed between the platen and the print bars. As seen in FIG. 6 there is a pin 109 engageable by the upper rear edge of each print bar as the platen engages the bars, and therefore a uniform print is obtained regardless of the number of digits being printed since the pins 109 are urged toward engagement with the print bar by means of a spring 110 which is disposed in the cross frame 111 which carries the pins 109. The drive for the platen is provided by cams 76 and 82 seen in FIGS. 5 and 6 which engage rollers carried by the levers 112 and 113 which are respectively connected to the frames 107 and 108. The lever 112 is pinned at 114 to the frame 107 and is connected by means of an adjustable connection at 116 to the frame 107. In a similar manner lever 113 is connected at 117 and 118 to the frame 108 to provide a parallel drive for the platen 106.

To accurately align the print bars prior to the movement of the platen into engagement with the bars and to prevent any strain upon the stop pins in the carriage during printing, an aligning bail 121 (FIG. 5) is driven downward into mesh with the teeth 51C provided along the upper surface of the print bars 51 near their front ends. The aligning bail 121 is carried in its right end by a lever 122 pivoted at 123 on the frame 17, and at its left end by a similar lever pivoted on frame 16. A link 125 is pinned to the rear end of the lever 122 coupled by means of a yielding joint with a slide 124 which is reciprocated by the engagement of the aligning cam 75 with the roller 126 extending to the left from the lower end of the slide 124. The lower end slide 124 is forked and is engaged in the groove of a collar on shaft 50 so that the slide is guided for its upward and downward travel. A spring 127 secured to the rear end of lever 122 and to the stationary stud 69 maintains the slide 124 under a downward urge so that its position is controlled by the aligning cam 75.

TOTALING

When a total is to be taken from the totalizer the add racks are engaged with the totalizer pinions during the first portion of a machine cycle as the bail 58 moves rearward so that springs 56 can pull the print bars and add racks rearward to differential positions determined by the amount in the respective pinions. A pinion can rotate until its wide tooth 61A engages the point of the transfer pawl 90 at which time further rotation is prevented by the holding of pawls 90 against any clockwise movement which would normally occur to initiate a tens transfer. After the print bars have assumed differential positions determined by the totalizer the printing mechanism is actuated in the previously described manner and the totalizer is then disengaged from the add racks with each pinion in the totalizer then standing at zero position. The cross bail 58 then restores the print bars and add racks to home position leaving the totalizer zeroized. If a subtotal operation is being performed the totalizer remains engaged with the add racks throughout rearward and forward travel of the racks so that the amount contained in the totalizer is not removed.

Since the plate 43 carried on the front of the pin carriage would normally prevent rearward travel of the print bars and add racks with the pin carriage in home position, the plate is elevated early in a total or subtotal cycle before the print bars move to engagement therewith. The mechanism for effecting such elevation of the plate 43 is described hereinafter in connection with the description of the operation control mechanism.

The device which serves to hold the pawls 90 against movement during a total-taking operation is seen in FIGS. 5, 6 and 9 and includes a comb 130 pivoted at 131 on a small shaft extending between the totalizer frames so that the comb 130 moves with the totalizer and the transfer pawls. A spring 132 serves to normally urge the comb 130 counterclockwise so that the upper end thereof is held away from the bottom edge of the transfer pawls 90. During a total or subtotal operation the comb 130 is moved clockwise to a position where the upper surface of the comb is disposed beneath the various transfer pawls to prevent clockwise movement thereof. The mechanism for so moving the comb 130 is seen in FIG. 9 and includes a lever 133 pivoted at 134 on the frame 17 carrying a leftwardly extending stud 136 which lies in a cam slot of a lever 137 pivoted at 138 on the left side of the frame 17. The lever 137 has a rearwardly facing rectangular opening with surfaces adaptable to the studs 130A and 130B extending to the right from the right end plate of comb 130. When the lever 133 is rocked counterclockwise the stud 136 moves lever 137 clockwise so that the opening therein can be engaged by the two studs 130A and 130B. Thereafter when the totalizer moves downward for engagement with the lower geared sections of the add racks the engagement of the stud 130B with the lever 137 will rock the comb 130 clockwise and hold it in such clockwise position throughout the total or subtotal cycle. If the amount in the totalizer is a negative quantity the totalizer will be engaged with the upper geared sections of the add racks during a total or subtotal cycle and therefore upon such upward travel of the totalizer the stud 130A by engaging the upper surface of the rectangular opening in lever 137 will rock the comb 130 clockwise to prevent tripping of a transfer pawl. A slide 139 having a leftwardly extending stud engaged with the slot in lever 133 serves to control the movement of the lever 137, said slide 139 in turn being controlled by the lower end of a lever 135 pivoted on the left side of frame 18. As seen in FIG. 2 the lever 135 is rocked counterclockwise when the total or subtotal keys are operated and therefore the slide 139 is held rearward during total and subtotal operations.

CIPHER SUPPRESSION

During amount entering cycles of operation the plate 43 on the front of the pin carriage is in its lowermost position where it is effective to prevent printing of zeros to the left of the highest number to be entered into the totalizer, but during a total or subtotal operation the plate 43 is elevated so that the print bars and amount actuators can move to differential positions determined by the totalizer. Prior to movement of any add rack the associated print bars move from home positions to zero positions under the urge of springs 54 and therefore the zero type font on each print bar would be moved to a position where it would be engaged by the platen during the printing operation. Therefore a zero would be printed in each column to the left of the highest significant digit. Thus, as is common in the art, means is provided for preventing the printing of zeros to the left of the highest digit in a total or subtotal operation, which in the present machine is accomplished by restoring each of the higher order print bars to their home positions prior to the printing operation.

As seen in FIGS. 6 and 7A each of the print bars is undercut along its lower front edge to provide an abutting surface 51D which is engageable by one of the plurality of cipher block pawls 140 supported on the shaft 141 carried by the levers 142 and 143 seen respectively in FIGS. 5 and 6 to be secured to a shaft 144 extending between frames 16 and 17. Each pawl 140 is urged clockwise on shaft 141 by a spring 146 while the levers 142 and 143 together with shaft 144 to which they are pinned are urged clockwise by spring 147 (FIG. 5). With the shaft 144 in its normal clockwise position the tail 140A on the pawl in the highest order (FIG. 7A) is in engagement with a stud 148 extending to the right from frame 16 and therefore the highest order latch 140 is held in a counterclockwise position on the shaft 141 with its abutting surface 140B disposed below the path of travel of the lower surface of the highest order print bar. Each pawl 140 as seen in FIG. 7C has a rightwardly extending lug 140C which underlies the rearwardly extending tail of the adjacent lower order pawl and therefore the stud 148 acting on the tail of the highest order pawl serves to hold all of the pawls in a counterclockwise position on the shaft 141 against the urge of springs 146 so that the print bars can move rearward without interference during a total or subtotal operation.

During each cycle of operation after the print bars have moved rearward toward differential positions which during a total or subtotal operation would be determined by the totalizer, the shaft 144 is rotated counterclockwise to cause shaft 141 and each of the pawls thereon to move in a counterclockwise direction around the center of shaft 144. During such counterclockwise rotation of shaft 144 the springs 146 tend to rotate the associated pawls 140 clockwise on shaft 141. As seen in FIG. 7A, if the highest order print bar has merely moved to zero position due to the highest order pinion in the totalizer being at zero the abutting surface 140B on the highest order pawl will move into latching relationship with the abutting surface 51D and thus the continued counterclockwise rotation of shaft 144 will serve to drive the highest order print bar back to home position where the zero type font thereon is out of the path of travel of the platen. In a similar manner each of the lower order pawls associated with a print bar standing in zero position tends to rotate clockwise on shaft 141 as the shaft 141 moves counterclockwise about the center of shaft 144, and therefore such other pawls tend to restore the associated print bars to home position. However, as seen in FIG. 7B, if a print bar moves to any position beyond zero position, for example to a "1" position as illustrated in FIG. 7B, the abutting surface 51D on the print bar will be moved to the rear of the forward edge of the abutting surface 140B on the associated pawl and therefore that pawl will be ineffective to restore the print bar to home position. Any pawl 140 which is thus prevented from moving into engagement with the abutting surface 51D on its associated print bar will therefore through its rightwardly extending lug 140C serve to hold the adjacent lower order pawl 140 in a counterclockwise position so that such lower order pawl will be ineffective to reset its associated print bar to home position. This action would be repeated into the lowest order and hence if any print bar to the right of a print bar moving to a non-zero position had itself moved only to zero position then such print bar would not be restored to home position. Thus it is seen that zeros will not be printed to the left of the highest digit in a total or subtotal operation while zeros to the right of the highest digit will be printed.

The means for rotating shaft 144 in a counterclockwise direction prior to the printing portion of a machine cycle is shown in FIG. 5 and includes a lever 152 pinned to the right end of the shaft 144 and coupled with the front end of a bellcrank 153 pivoted on the frame 18. The bellcrank 153 has two rearwardly extending arms, one of which is engageable with the roller 76A carried on the left side of the printing cam 76 while the other engages the roller 76B on the right side of cam 76. The engagement of the rollers with the bellcrank is such that the bellcrank is rocked clockwise during a machine cycle prior to the movement of the platen toward the print bars and counterclockwise near the end of the cycle.

During listing operations it is desirable to print a zero in the tens order when there has been only a single digit entered into the pin carriage. Thus a latch 149 (FIG. 8) urged clockwise on the shaft 144 by a spring 150 is provided for holding the pawl 140 in the second order from engaging the abutting portion of the print bar 51 in the second order under certain conditions when the shaft 144 rotates counterclockwise. The print bar 51 in the tens order carries a rightwardly extending stud 151 which is engaged by the front end of the latch 149 when the tens order print bar is in home position to thereby hold the latch in its most counterclockwise position. Thus the leftwardly extending lug 149A on the latch is positioned forward of the elongated lower front nose on the pawl 140 in the second order. Therefore when the tens order print bar is held in its most forward or home position the cipher block pawl in the tens order will operate in the manner previously described. However, when the tens order print bar is allowed to move rearward to zero position the latch 149 will move clockwise under the urge of spring 150 so that its leftwardly extending lug 149A is in the path of the elongated nose on the tens order pawl 140 and therefore will serve to hold the pawl 140 in the second order in a counterclockwise position as the shaft 144 rotates. Restoring of the second order print bar to home position prior to the printing operation will therefore be prevented.

As seen in FIGS. 8 and 13 the lower right end of the plate 43 is offset to the rear in a manner such that the print bar aligned with the right end of the plate 43 will always be allowed rearward travel to zero position during each machine cycle. Since the right end of the plate 43 is aligned with the units order print bar (seen in FIG. 13 to be adjacent to the symbol print bar) when the pin carriage is in its right-hand home position, the entry of a single digit into the pin carriage will bring the offset portion at the right end of plate 43 into alignment with the tens order print bar and therefore allow the latch 149 to control the pawl 140 in the tens order and cause printing of a zero in the tens order. The latch 149 serves a further purpose in that if a total is taken when the totalizer is clear the movement of the tens order print bar to zero position enables the latch 149 to be operative to hold the second order pawl 140 against operation and thereby cause printing of two zeros since the tens order pawl 140 will then serve to hold the units order pawl 140 against resetting engagement with the units order print bar.

TOTALIZER CONTROL

The mechanism for moving the totalizer into engagement with the add racks at the proper time in a machine cycle for the various operations to be performed is shown in FIG. 4 and includes a bellcrank lever 160 pivoted at 161 on the left side of stationary frame 18, said bellcrank 160 having a rearwardly extending arm 160A which encompasses the right end of the totalizer shaft 61. The bellcrank lever 160 carries a plate 162 having a pair of leftwardly extending studs 163 and 164 which are so spaced with relation to the noses on a meshing hook 166 that one or the other of the bent-over ends of the hook 166 is engaged with one of the studs. The meshing hook 166 is pivoted at 167 on the forward arm of a bellcrank 168 which is supported on a stud 169 extending to the left from frame 18. A spring 170 connected to a rearwardly extending arm of bellcrank 168 serves to constantly urge the bellcrank clockwise and thus maintain the meshing hook 166 in its elevated position shown in FIG. 4. The meshing hook 166 is normally held counterclockwise on the bellcrank 168 with its upper rear nose engaged with the stud 163 and therefore if the bellcrank 168 is rocked counterclockwise the resulting downward movement of the meshing hook 166 will rock bellcrank 160 clockwise and move the totalizer pinions into engagement with the lower geared section of the add racks. If the meshing hook 166 is moved clockwise to bring the front nose over the stud 166 prior to movement of bellcrank 168 the subsequent downward movement of the meshing hook will pull the bellcrank 160 counterclockwise and thereby move the totalizer into engagement with the upper geared sections of the add racks.

The bellcrank 168 is rocked counterclockwise at the proper time during a listing operation by means of the listing cam 73 acting on a lever 180 pivoted on the stud 169 and carrying a forwardly extending horizontal driving link 181 which has a vertical surface engageable with the cross bar of bellcrank lever 168. The link 181 is pinned to the lower end of a vertical link 182 which is in turn pinned at its upper end to the rear end of a lever 183 supported on a stud 184 extending to the left from frame 18, said lever 183 being urged clockwise into engagement with a limit stud 185 by means of a spring 186. A lever 187 identical to the lever 180 carries a second horizontal driving link 188 which is pinned to the lower end of a second vertical link 189 carried at its upper end by a lever 190 which is also supported on the stud 184 and is urged clockwise into engagement with the limit stud 185. As seen in FIG. 4 the vertical surface of the driving link 181 is normally disposed in line with the horizontal bar of the bellcrank 168 and therefore rotation of the main driveshaft and cam 73 would serve to rock bellcrank 168 counterclockwise prior to the return of the add racks to home position and thus be effective to bring the totalizer into mesh with the add racks for a listing operation. When the total key 191 is depressed a rearwardly extending portion 191A of its keystem (FIG. 2) engages the leftwardly extending lugs 183A and 190A of the levers 183 and 190 and thus serves to move the first horizontal driving link 181 to a position above the cross bar of bellcrank 168 and to pull the vertical surface of the second driving link 188 into engaging relationship with the bellcrank 168. Therefore the totaling cam 74 will be effective to bring the totalizer into mesh with the add racks during the early portion of a machine cycle and the cam 73 will be unable to hold the totalizer in mesh with the add racks during the second half of the cycle. During a subtotal operation the totalizer must remain in mesh with the add racks during their rearward and forward travel and therefore only the lug 190A is long enough to be engaged by the subtotal keystem so that the depression of the subtotal key 192, as seen in FIG. 2, serves to rock only the lever 190 to bring the vertical surface of driving link 188 into position for driving bellcrank 168. Therefore during a subtotal cycle of operation the cam 74 will drive the totalizer into mesh with the add racks during the first portion of a machine cycle and the cam 73 will maintain the totalizer in engagement with the add racks during the second portion of the machine cycle as the add racks are being driven to their home positions. Also as seen in FIG. 2 the lever 190 has a stud 190B at its front end engaged in the slot at the top of lever 135 and therefore the counterclockwise rocking of lever 190 caused by operation of the total or subtotal keys serves to move the lever 135 clockwise to block the transfer pawls in the manner shown in FIG. 9.

As seen in FIG. 4 the meshing hook 166 has a rightwardly extending stud 166B engaged in a vertical slot on a slide 171 supported on the left side of frame 18 for forward and rearward travel. A spring 172 holds the slide 171 forward and thus serves to normally hold the meshing hook 166 in a counterclockwise position on the bellcrank 168 so that the counterclockwise rotation of bellcrank 168 will normally be effective to pull the totalizer into mesh with the lower geared sections of the add racks for positive totals and additive entries.

As described hereinafter a machine cycle is initiated when a cycle trip slide 174 (FIG. 3) is moved rearward, and thus as seen in FIG. 4 a leftwardly extending stud 176 on the cycle trip slide 174 serves to provide the power for pivoting the meshing hook 166 clockwise when a subtract operation is to be performed. As seen in FIG. 4, when the subtract key 193 is depressed a rearwardly extending portion of its keystem serves to rock a lever 194 counterclockwise and therefore a vertical link 196 having a stud engaged by a slot in the lower rear end of lever 194 is pulled upward. The lower end of link 196 is pinned to the forward arm of a lever 197 pivoted on a stud 198 extending to the left from frame 18 and therefore when the link 196 moves upward the rear end of lever 197 moves downward to pull a subtract indexing slide 199 carried on the left side of slide 171 downward. The slide 199 has a vertical nose 199A which is normally positioned above the leftwardly extending lug 176 on the cycle trip slide 174 so that when the trip slide moves rearward to initiate a machine cycle the lug 176 will pass beneath the nose 199A. However when the subtract key 193 is depressed the nose 199A is moved down into the path of the lug 176 and therefore the rearward travel of the cycle trip slide 174 will carry the slide 171 rearward. Through its engagement with the stud 166B on the meshing hook 166 the slide 171 will therefore serve to rock the meshing hook clockwise into engagement with the stud 164. Thus the later downward movement of the meshing hook will pull the totalizer into engagement with the upper geared section of the add racks for a subtract operation.

CYCLE INITIATION

Each of the operation control keys serves to initiate a machine cycle by releasing the cycle trip slide 174 for rearward travel which as seen in FIG. 3 through its rightwardly extending stud 174A serves to rock a bellcrank lever 200 pivoted on the right side of frame 18 counterclockwise. The bellcrank 200 has a rightwardly extending stud 200A which is engaged in the slotted forward end of a second bellcrank 201 pivoted on the right side of frame 18 and carrying a vertical stud 201A on the top of its rear arm for controlling an electrical switch 202. When the lever 201 is in the position shown in FIG. 3 the switch 202 is open but upon clockwise rocking of bellcrank 201 the switch 202 is closed to thereby provide a closed circuit for an electric motor 203 having an output shaft 204 with a gear thereon for driving the machine through cycles of operation. The motor 203 operates through a well-known overload clutch 206 to drive a gear 207 which is free for rotation on the right end of the main driveshaft 50. The gear 207 carries a driving plate 208 on its left side and therefore when the motor 203 is energized in response to closing of the switch 202 the drive plate 208 is driven clockwise on shaft 50. A cam 71 secured to the driveshaft 50 carries a drive pawl 209 on its right side, said pawl 209 having a downwardly extending nose which is adapted to be engaged between adjacent lugs on the driving plate 208. A bellcrank lever 210 carried on the same stud which supports bellcrank 200 carries a small slide 211 on its rearwardly extending arm, said slide 211 having a rightwardly extending lug 211B which engages the vertical portion of the driving pawl 209 to thereby normally hold the pawl 209 in a counterclockwise position on the cam 71 against the urge of a spring 212 which normally tends to bring the nose of the pawl into engagement with the driving plate 209. The bellcranks 200 and 210 are spring urged in a clockwise direction into engagement with the stud 174A and therefore when the slide 174 is in its forward or home position the switch 202 is open and the bellcrank 210 together with the slide 211 thereon serves to hold the main driveshaft 50 against rotation. However when the slide 174 moves rearward in a manner described hereinafter the bellcranks 200 and 210 will be driven counterclockwise to close the circuit for the motor and also to release the pawl 209 for engagement with the drive plate 208.

Near the end of the machine cycle a high portion of cam 71 engages a roller on the right side of slide 174 and therefore serves to reset the slide 174 to its home position. This forward movement of slide 174 releases bellcrank 210 for clockwise movement to bring the lug 211B into the path of the driving pawl 209 and hence serve to disengage the pawl from the driving plate and to hold the main driveshaft 50 against further rotation. The rear surface of bellcrank 200 is substantially concentric with the path of travel of the high point on cam 71 and is so spaced with respect to the cam that even though the slide 174 moves forward to release the bellcrank 200 for clockwise rotation the sam 71 serves to hold the bellcrank 200 in a position where the switch 202 remains closed. Then when the high point on the cam 71 moves beyond the upper end of the curved surface of bellcrank 200 the bellcrank will rock clockwise and allow the bellcrank 201 to open the switch 202.

The means for releasing trip slide 174 for rearward movement to initiate a machine cycle in response to the operation of the various control keys is shown in FIG. 2 and includes a slide 220 disposed beneath the leftwardly extending lugs on the keystems of the four control keys along the right-hand side of the keyboard. The slide 220 has four slots disposed at such an angle that if any one of the four control keys seen in FIG. 2 is depressed the slide 220 will be driven rearward and therefore the lever 221 and shaft 222 to which it is pinned will be rocked clockwise. A small slide 223 which is coupled at its forward end with the right end of shaft 222 by means of the link 224 secured to the right end of the shaft 222 is thus pulled forward in response to depression of the operation control keys. As the slide 223 moves forward the square stud 226A extending to the left from a lever 226 pivoted on the stud 227 extending to the right from frame 18 falls off the abutment provided in the slide 223 and therefore the spring 229 connected to the lower front end of lever 226 is effective to pull the lever 226 counterclockwise to a position where it is effective to hold the slide 223 forward and prevent release of the depressed operation control key.

A rightwardly extending stud 226B on lever 226 overlies the top surface of a lever 230 pivoted on a stud 231 extending to the right from frame 18 and therefore counterclockwise movement of lever 226 is effective to rock lever 230 clockwise against the counterclockwise pull of a small spring 232 which is connected to the lever 230. A rightwardly extending rectangular stud 230A on the lever 230 is positioned at its right end above a lug 233A formed in a lever 233 carried by a stud 234A extending to the right from a trip slide latching arm 234 pivoted on the stud 231 and urged counterclockwise by a spring 236. The latch arm 234 has a leftwardly bent-over lug 234B at its rear end which is engaged with the rightwardly extending rectangular stud 174B on the trip slide 174 to thereby normally hold the trip slide in its forward position against the rearward urge of spring 237 connected to the lower front end of the trip slide.

The spring 229 which urges lever 226 counterclockwise is stronger than the spring 236 which holds the trip slide latch 234 in engagement with the lug 174B and therefore when the shaft 222 is rocked clockwise by the depression of a control key the spring 229 acting through lever 226 will be effective to pull lever 230 clockwise. Thus the rightwardly extending rectangular stud 230A will drive the lever 233 downward and carry the lever 234 clockwise to release the cycle initiating slide 174 for rearward travel. When the slide 174 is driven forward near the end of a machine cycle the rightwardly extending stud 174C near its front end engages the lower rear end of lever 226 to thereby rock lever 226 clockwise. The spring urged key interlock slides (not shown) together with the springs which urge the keys upward serve to urge slide 220 forward beneath the control keystems and to return slide 223 rearward for latching engagement with the stud 226A on lever 226. At the same time the spring 236 connected to lever 234 is effective to pull the leftwardly extending lug 234B up into position behind stud 174B to again hold slide 174 in its forward position.

In the prior art means has generally been provided for preventing the operation of the total and subtotal keys when the pin carriage is displaced from home position since in such event the print bars might be limited in their rearward travel by the pins in the carriage rather than by the cipher stops in the totalizer, as for example if the amount in the totalizer in a given column is larger than the value associated with a particular depressed pin. However this leads to a disadvantage if the machine is provided with a repeat key since the operation of the repeat key serves to disable the restoring of the pin carriage and therefore an additional machine cycle must be performed after a repeat operation to restore the carriage to home position to release the interlock between the pin carriage and the total-taking keys. The present machine as seen in FIG. 11 is provided with a repeat key 240 disposed on the left side of the keyboard and adapted to move a slide 241 (FIG. 11) rearward to rock the lever 242 and shaft 222 clockwise to initiate a machine cycle in the same manner as to the total, subtotal, add and subtract keys. From the previously described cycle initiating mechanism it will be seen that if the repeat key 240 is held depressed when the cycle trip slide 174 is driven forward near the end of the machine cycle the shaft 222 will be held in its clockwise position and therefore prevent relatching of the cycle trip slide 174. Hence repeated machine cycles will occur as long as the repeat key is held depressed.

As seen in FIG. 11 the keystem for the repeat key is provided with a leftwardly extending lug 240A which overlies the front end of a lever 243 pivoted at 244 on the right side of frame 15 and carrying a rightwardly extending lug 243A which overlies the top surface of the lever 47 pivoted on the pin carriage restoring arm 48 for rotation in a vertical or a horizontal plane. A spring 246 connected to the rightwardly extending stud 243A and to a rightwardly extending lug on the lever 47 holds the lug 243A in engagement with the top surface of lever 47. When the repeat key 240 is depressed lever 243 is rocked counterclockwise and therefore is effective through the spring 246 to pull lever 47 counterclockwise so that the U shaped end of lever 47 is disposed above the path of travel of the upper end of the lever 46. Thus the pin carriage will not be restored by the cam 84 and lever 46 near the end of the machine cycle. As long as the repeat key is held depressed it is seen that the pin carriage will remain displaced in the position which it assumes in response to the operation of the numerical keys. When the repeat key is no longer held down and is thus released by the return of the shaft 222 to home position at the end of the cycle the spring 49 returns lever 47 to its initial position so that lever 46 is once again in position to restore the pin carriage to home position during a subsequent cycle initiated by any key other than the repeat key.

PIN CARRIAGE-TOTALING INTERLOCK

As seen in FIG. 10 a slide 250 urged rearward by a spring 251 (FIG. 2) is supported beneath the total and subtotal keys for forward and rearward travel. A lever 252 supported for rotation in a vertical plane by means of a brace 248 has a leftwardly extending stud 252A at its rear end which is normally engaged with the rear surface of the front vertical portion of slide 250 to thereby hold the slide 250 in its forward position so that the slots provided in the rear section of the slide are in alignment with the leftwardly extending rectangular studs on the total and subtotal keystems. A bellcrank lever 253 pivoted on a shaft 254 extending between the frames 15 and 18 has a rearwardly extending rectangular stud 253A which is positioned beneath a pawl 256 on the front of the pin carriage when the carriage is in its home position. The right end of bellcrank 253 extends upwardly and is pinned to the downwardly extending arm of lever 252, and thus the bellcrank 253 is urged counterclockwise by the spring 257 which is seen in FIG. 10 to be connected to lever 252 in a manner such that lever 252 is urged clockwise. When the pin carriage is in its right-hand home position the pawl 256 as seen in FIGS. 10 and 12 overlies the rectangular stud 253A and therefore the lever 252 is held in a counterclockwise position where it is effective to hold slide 250 in its forward position. As soon as the pin carriage undergoes a slight movement to the left in response to the initial escapement of the pin carriage caused by depression of a numerical key the pawl 256 will be moved away from stud 253A and therefore slide 250 will be released to move rearward where its top surface will underlie the leftwardly extending studs on the total and subtotal keystems and prevent their being operated.

When the pin carriage is restored to home position the pawl 256 engages stud 253A and is rocked clockwise against the urge of spring 258 (FIG. 13). Then as the carriage moves further to the right the roller 27 extending forwardly from the carriage engages the left curved surface of bellcrank 253 and rocks it clockwise so that the spring 258 can pull pawl 256 counterclockwise into engagement with the limit stud 259 where it will then be effective to hold the slide 250 in its forward position. The carriage is driven a short distance beyond its home position during such restoring operation and is then allowed to return a short distance to the left so that the pawl 256 is controlling the bellcrank 253. It is thus seen that as soon as the pin carriage undergoes its first leftward movement from home position the slide 250 will move rearward and block the total and subtotal keys against operation until the slide 250 is restored to its forward position, as for example by the return of the pin carriage to home position. Therefore it is impossible to accidentally destroy an amount in the pin carriage by the operation of the total or subtotal keys prior to the entry of such amount into the totalizer.

As previously described the repeat key 240 is effective to disable the pin carriage restoring mechanism so that an amount in the pin carriage can be repeatedly entered into the totalizer, such entry being additive if only the repeat key is operated and subtractive if the repeat and the subtract keys are operated simultaneously. Since it is common in ten key machines to perform multiplication by successively stepping the pin carriage to different columnar positions for amount entering depending upon the order of the multiplier digit, it is necessary that at the end of a cycle of operation initiated by the repeat key the pin carriage remain displaced from home position. However, as previously described, when the pin carriage is moved from its home position the slide 250 is effective to block the total and subtotal keys and therefore if a total or subtotal is desired following a repeat operation it is necessary that the slide 250 be returned to its forward position where its vertical slots are in alignment with the leftwardly extending studs on the total and subtotal keystems. The release of the pin carriage-total interlock following a repeat operation has normally been effected by the return of the pin carriage to home position through the operation of the usual error key provided on ten key machines of the type illustrated herein. Such return of the carriage is necessary on many machines for the additional reason that the pins in the carriage are only reset in response to movement of the carriage to home position and therefore a correct total or subtotal is not obtained with the carriage displaced from home position.

Means is provided in accordance with the present invention for resetting each of the pins in the carriage early in a total or subtotal machine cycle and prior to the rearward travel of the print bars so that a total or subtotal operation can be performed with the pin carriage displaced from home position. Means is also provided for releasing the pin carriage-total interlock in response to the operation of the repeat key so that the blank cycle normally required to enable the total and subtotal keys following a repeat operation is eliminated.

As seen in FIG. 10 a lever 260 pivoted at 261 on the top of the plate 262 through which the various keystems pass has its left end disposed in alignment with the vertical nose on the front end of a slide 263 supported beneath the repeat key 240 and adapted to be driven rearward in response to the operation of the repeat key. The right end of lever 260 is positioned for engagement with the front end of slide 250 and therefore when the repeat key is operated the lever 260 is rotated clockwise to drive the slide 250 to its forward position. Since the spring 251 would normally return the slide 250 to its rear position when the repeat key 240 is released a latching lever 264 urged clockwise by a spring 266 is provided for moving into engagement with a notch in the top surface of slide 250 when it is driven forward by the lever 260. It is thus seen that once the repeat key has been operated the slide 250 will be latched in its forward position so that the total and subtotal keys are operable even though the pin carriage is displaced from its home position with an amount therein. Since the slide 250 must be free to move rearward in response to the first leftward movement of the pin carriage from home position during the entry of an amount the latching lever 264 is provided with a rearwardly extending lug on its lower arm which is engaged by the vertical stud 267 on the pin carriage when the pin carriage returns to home position, such engagement by the stud 267 serving to hold the lever 264 in a counterclockwise position where it is ineffective to hold the slide 250. The relationship between the stud 267 and the pawl 256 which holds bellcrank 253 is such that as the pin carriage moves away from its home position as the first digit is entered therein the slide 250 will move rearward to a position where the notch normally engaged by the latching lever 264 is to the rear of the lever 264. Thereafter when the stud 267 releases the lever 264 the spring 266 merely urges the lever clockwise into engagement with the top surface of slide 250 where it rests so that if the slide 250 is driven forward in response to the operation of the repeat key the latching lever 264 will be effective to move into the notch provided in the top of slide 250.

The means for restoring the pins in the carriage during the early portion of a total or subtotal machine cycle is shown in FIG. 10 and includes a power-driven slide 270 supported on the left side of frame 15 and carrying a roller 271 at its rear end. A spring 272 urges the slide 270 rearward to maintain the roller 271 in constant engagement with the cam 85 secured to the left end of the main drive shaft 50. The shape of the cam 85 is such that the slide 270 is driven forward early in each machine cycle and returns to its rearward position during the second half of a machine cycle. Slide 270 carries a driving pawl 273 at its front end which is urged clockwise by a spring 274 to maintain the front end of the pawl 273 in engagement with a leftwardly extending stud 276A on a bellcrank 276 pivoted on the shaft 254. When the bellcrank 276 is in its normal position the stud 276A holds the pawl 273 in a position such that its leftwardly extending rectangular stud 273A passes beneath the upper rear portion of the left arm on a bellcrank lever 277. Thus the slide 270 normally reciprocates during each machine cycle but since the bellcrank lever 276 holds the driving pawl 273 in the position shown in FIG. 10 the stud 273A is ineffective to drive the bellcrank lever 277. As seen in FIG. 10 the right end of bellcrank lever 276 is connected by a link 278 with the lower end of the lever 135 which as previously described is rocked counterclockwise in response to the operation of either the total or subtotal keys. Therefore when the total or subtotal key is operated the bellcrank 276 is rocked clockwise so that the stud 273A on pawl 273 is elevated to a position where it is engageable with the bellcrank 277 pivoted on the left end of shaft 254.

The bellcrank 277 is pinned at 279 to the vertical arm of another bellcrank lever 280 also pivoted on the shaft 254 and carrying a rearwardly extending link 281 which is used to drive a movable pin restoring plate 282 upward when the link 281 moves forward. To this end the link 281 carries a first rightwardly extending stud 281A which is positioned behind a camming pawl 283 pivoted on the left side of frame 16 and having a cam slot in its front end encompassing a leftwardly extending stud carried by the front left corner of the pin resetting plate 282. The rear end of slide 281 is connected by means of a pin 284 with the downwardly extending arm of a bellcrank 286 pivoted on the left side of frame 16 and having a forwardly extending arm forked and engaged with a second leftwardly extending stud carried by the pin restoring plate 282. The arrangement is such that when the bellcrank 279 is driven counterclockwise by the slide 270 acting through the pawl 273 and bellcrank 277 the link 281 is driven forward and therefore the pin restoring plate 282 is driven upward. As seen in FIG. 10 the pin restoring plate 282 is provided with longitudinal slots to allow the noses on the print bars to move therein during amount entering cycles of operation when the plate 282 is in its lowered position. However the width of material defining adjacent slots in the plate 282 with respect to the width of the pins is such that when the plate 282 is driven upward the pins in the carriage are reset to their initial positions. Thus with the plate 282 elevated the print bars can move rearward to differential positions limited by the cipher stops and value teeth in the totalizer to provide a correct total or subtotal. Since the pins are restored to ineffective positions while the pin carriage is displaced from home position in response to the operation of the total or subtotal keys the usual pin carriage restoring means can be utilized near the end of a total or subtotal operation to return the carriage to its home position.

The right end of the bellcrank lever 280 is pinned to the forward end of a link 291 similar to the link 281, said link 291 having a leftwardly extending stud 291A for driving a pawl 293 similar to the pawl 283 but pivoted on the right side of frame 17, and also being pinned at at its rear end to a bellcrank lever 296 similar to bellcrank lever 286 but supported on tre right side of frame 17. Thus when the bellcrank lever 280 is rocked counterclockwise both ends of the pin restoring plate 282 will be simultaneously elevated to provide a uniform movement of the plate. The print bars start to move rearward after driveshaft 50 rotates through approximately 12 degrees, whereas the pin restoring plate 282 has been elevated to its pin restoring position after approximately 10 degrees of revolution of the driveshaft and therefore the pins will not interfere with the totaling operation. The plate 43 on the front of the pin carriage rests on top of the plate 282 and therefore the plate 43 is elevated during a totaling operation to a position where it will not interfere with the movement of the print bars. The shape of cam 85 is such that the pin restoring plate 282 is held in an elevated position until the print bars and add racks thereon have been restored to their home positions.

The present machine is provided with means for obtaining a total from the plus motor bar or key 300 if the pin carriage is in its home position or if the plus motor bar is operated following the entry of an amount through the use of the repeat key. As previously described the movement of the pin carriage from its home position serves to release the total and subtotal blocking slide 250 for rearward movement under the urge of spring 251 (FIG. 2). This movement of the slide 250 is used to position the necessary elements for a total operation to occur in response to the operation of the add key 300 when the slide 250 is in its forward position. As seen in FIG. 2 the slide 250 has a rightwardly extending stud 250A engaged in the forked left end of a bellcrank 301 pivoted on a stud 302 extending to the right from stationary frame 18. The lower right end of bellcrank 301 is forked and encompasses a stud 303A extending to the right from a bellcrank lever 303 pivoted on a stationary stud extending to the right from the frame 18. When slide 250 is in its forward position the upper end of the bellcrank lever 303 is positioned to the rear of the leftwardly extending rectangular stud 304A on a bellcrank 304 supported by the stud 306 extending to the right from frame 18, but when slide 250 moves rearward the upper end of bellcrank 303 is moved beneath the stud 304A. Bellcrank 304 is urged counterclockwise by a spring 307 but is held against counterclockwise movement by the engagement of its rightwardly extending stud 304B with a substantially horizontal latching surface on the latch 308 pivoted on a stationary stud 309. A spring 310 urges the latch 308 in a counterclockwise direction to thereby normally maintain its latching surface in engagement with the rectangular stud 304B extending to the right from the bellcrank lever 304. The position of the upper end of bellcrank lever 303 is thus seen to be controlled by the slide 250 which is in turn positioned by the pin carriage in the manner previously described. When the slide 250 is in its forward position corresponding to the pin carriage being in its home position or following the operation of the repeat key, the bellcrank lever 303 is in its most clockwise position with the upper end thereof disposed to the rear of the leftwardly extending rectangular stud 304A on bellcrank 304.

The add key 300 has a rightwardly extending lug 300A which overlies the leftwardly extending arm 311A of a bellcrank 311 pivoted on the stationary stud 309 and therefore when the add key is depressed the bellcrank 311 is rocked clockwise so that its downwardly extending arm 311B by engaging the rightwardly extending stud 308A serves to move the latch 308 away from the stud 304B. Thus the bellcrank lever 304 is released for counterclockwise movement under the urge of spring 307 if the slide 250 is in its forward position where it is operative through bellcrank 301 to maintain the upper end of bellcrank 303 to the rear of the stud 304A. When the bellcrank 304 is thus released for counterclockwise movement by the operation of the add key its upper rear arm 304C by engaging the rightwardly extending stud 312A rocks a bellcrank lever 312 in a clockwise direction. The rearwardly extending arm of bellcrank 312 overlies a rightwardly extending stud 190C on the totaling bellcrank lever 190 and therefore the lever 190 will be moved counterclockwise when the bellcrank 304 is pulled counterclockwise by the spring 307. Thus as previously described the totalizer will be engaged with the add racks during the second half of the machine cycle. The bellcrank 312 also carries a rightwardly extending stud 312B which overlies the leftwardly extending lug 313A on the lever 313 which has its rear end disposed over a rightwardly extending stud 183B on the add lever 183 (FIG. 4). Therefore lever 183 will be rocked counterclockwise and thus as previously described will be in a position to prevent engagement of the totalizer with the add racks during the first half of the machine cycle. Accordingly, a total operation will be performed in response to the operation of the add key when the slide 250 is in its forward position.

Since the total-taking machine cycle being initiated by the add key must not begin until the total and add control levers 183 and 190 have been properly positioned, the cycle initiating mechanism for the add key includes the link 314 pinned to the front end of bellcrank 304 and having its lower end slotted to encompass the rightwardly extending stud 234A on the cycle trip latch 234. The bellcrank lever 311 which as previously described is rocked clockwise when the add key is operated carries a rightwardly extending stud 311C which is engaged in a slot in the upper end of the lever 233 carried on the right end of the stud 234A and therefore the operation of the add key serves to move the lever 233 counterclockwise to a position where its lug 233A is positioned forward of the stud 230A. Hence when the stud 230A moves downward in response to rearward travel of slide 220 caused by operation of the add key the lever 233 will be ineffective to initiate a machine cycle. Therefore it is seen that when the machine is to perform a total-taking operation in response to the depression of the add key 300 that the cycle trip slide 174 will be released due to the downward movement of link 314 which is in turn caused by the counterclockwise rotation of bellcrank lever 304. The timing of the engagement of the link 314 with the stud 234A on the cycle trip latch 234 is such that the total and add control levers are positioned before the stud 234A is driven downward.

Since the lever 233 which is normally operative to drive the cycle trip latch 234 clockwise in response to the operation of the cycle initiating keys is disabled when the add key is operated a further cycle initiating member must be provided to release the cycle trip slide when the add key is operated with bellcrank 304 held against movement. To this end a lever 316 pivoted on the stud 234A is connected by a link 317 with the bellcrank lever 303 in a manner such that when the bellcrank lever 303 is in its counterclockwise position for blocking the bellcrank 304 the upper end of lever 316 is disposed beneath the rectangular stud 230A. Therefore when the stud 230A moves downward it will drive the lever 316 and hence stud 234A downward to release the cycle trip slide for its cycle initiating rearward travel. When the slide 250 is in its forward position the bellcrank 303 will be held to the rear of stud 304A to permit movement of the bellcrank 304 and therefore the lever 316 will be pulled to the rear of the path of travel of stud 230A so that the machine cycle can be initiated by link 314.

From the above it is seen that if the slide 250 which is controlled by the pin carriage and the repeat key is in its forward position prior to the operation of the add key a total-taking cycle of operation will be performed, while operation of the add key with the slide 250 in its rearward position will cause an amount entering cycle of operation. Since it may be desirable to disable the feature of obtaining totals from the plus motor bar a manually settable lever 320 pivoted on the stud 321 which supports the bellcrank 312 is provided, the lower end of said lever 320 being pinned to a link 322 carried on a stud extending to the right from frame 318. Link 322 has a downwardly extending arm coupled by means of a pin in slot connection with a lever 323 carried by the stud 234A. When the lever 230 is in its forward position the link 321 is pulled rearward so that the lug 323A on lever 323 is maintained to the rear of the stud 230A and the lower end of lever 320 is positioned to the rear of the rightwardly extending stud 304D on bellcrank 304. Therefore the spring 307 can operate to pull the bellcrank 304 in a counterclockwise direction. When the lever 320 is moved to its rearward position its lower end moves forward over the top of the stud 304D and hence prevents any counterclockwise movement of bellcrank 304. Therefore the machine will not be conditioned for a total-taking operation in response to depression of the add key. Only the link 314 would be operable to initiate a machine cycle in response to the operation of the add key when the slide 250 is in its forward position and therefore means must be provided for initiating such machine cycle when the bellcrank 304 is held against counterclockwise movement by the lower end of lever 320. Accordingly, the lever 323 is moved forward by the link 322 when lever 320 is moved to its clockwise position so that the lug 323A will be positioned beneath the stud 230A and therefore will serve to drive the cycle trip latch 234 clockwise when the add key is operated. A spring urged detent 324 is engaged with the stud 320A connecting lever 320 with link 322 to thereby maintain the lever in one of its two positions.

As seen in FIGS. 2 and 3 a three-armed lever 330 pivoted on the right side of the cycle trip slide 174 is provided with a rightwardly extending rectangular stud 330A which is positioned beneath a pawl 331 carried on the right side of bellcrank 304 when the cycle trip slide is in its forward home position. When the cycle trip slide moves rearward to initiate a machine cycle a spring 332 pulls the lever 330 clockwise to a position where the stud 330A will engage the lower end of pawl 331 as the slide 174 is driven forward near the end of the machine cycle. Thus the forward drive of slide 174 will serve to rock the bellcrank 304 clockwise to allow the latch 308 to re-engage the rightwardly extending stud 304B on the bellcrank 304. As the slide 174 approaches the end of its forward travel the downwardly extending arm of lever 330 engages stationary stud 333 so that the lever 330 is rocked counterclockwise to a position where the stud 330A is again positioned beneath the pawl 331.

From the above it is seen that the machine is provided with means whereby the operation of a single key can be used to cause various machine functions depending upon the condition of a control member prior to the operation of the key. Thus if an amount is entered into the pin carriage and the add key is then operated an amount entering cycle of operation will be performed. However, if following the entry of an amount into the pin carriage the repeat key is operated, the subsequent operation of the add key will cause a total-taking cycle of operation to be performed. The above-described mechanism further provides a ten key calculating machine in which a total or subtotal operation can be performed immediately following the operation of the repeat key even though the pin carriage is displaced from its home position when such total or subtotal cycle of operation is initiated.

What is claimed is:

1. In a ten key calculating machine having a carriage movable from a home position in response to the operation of numerical keys and including a plurality of elements in said carriage movable from first positions in response to the operation of the numerical keys, the combination comprising: carriage restoring means operative during a machine cycle to restore said carriage to its home position, means restoring said elements to their first positions as said carriage is restored to its home position, a total key operative to initiate a total-taking cycle of operation, and means responsive to the operation of said total key for restoring said elements to their first positions prior to operation of said carriage restoring means during said total-taking cycle.

2. In a calculating machine having a carriage movable from a home position in response to the operation of numerical keys and including a plurality of elements in said carriage movable from first positions in response to the operation of numerical keys, the combination comprising: a first cycle initiating member, first means responsive to the position of said carriage operative to prevent operation of said member when said carriage is displaced from its home position, carriage restoring means operative during a machine cycle to move said carriage to its home position, and a second cycle initiating member operative to disable said carriage restoring means and said first means.

3. A calculating machine as defined in claim 2 and including: means operative as said carriage is moved toward its home position to restore each of said elements to its first position, and means controlled by said first member for restoring each of said elements to its first position before said carriage restoring means is operative.

4. In a calculating machine having a carriage movable from a home position, a plurality of pins movable from first to second positions within said carriage, and carriage restoring means operative during the second half of a machine cycle to return said carriage to its home position, the combination comprising: first pin restoring means operative to restore said pins to their first positions as said carriage is moved to its home position; second pin restoring means; a control member; a pin carriage controlled means holding said member in a first position when said carriage is in its home position; means moving said member to a second position in response to movement of said carriage from its home position; a control key; means responsive to the operation of said control key when said member is in its second position to initiate an amount entering cycle of operation; means responsive to the operation of said control key when said member is in its first position to initiate a totaling cycle of operation; means operating said second pin restoring means during the first half of a machine cycle initiated by said control key when said member is in its first position; and selectively operable means for moving said control member to its first position while said carriage is displaced from its home position.

5. In a calculating machine having a carriage movable from a home position in response to operation of a numerical key the combination comprising: carriage restoring means operative during a machine cycle to return said carriage to its home position, a first member having a first position when said carriage is in its home position and movable to a second position in response to movement of said carriage from its home position, a first cycle initiating key operative to disable said carriage restoring means and to place said first member in its first position, a second cycle initiating key, and means responsive to said second key and said member operative to cause an amount entering cycle of operation to occur in response to operation of said second key when said first member is in its second position and to cause a total-taking cycle of operation to occur in response to operation of said second key when said first member is in its first position.

6. In a calculating machine having a carriage movable from a home position in response to operation of a numerical key and including a plurality of settable elements in said carriage each movable from a first position in response to operation of a numerical key, the combination comprising: carriage restoring means operative during a machine cycle to restore said carriage to its home position; means returning said elements to their first positions as said carriage is restored to its home position; a first operation control key; means operating in response to operation of said first control key to return said elements to their first positions before said carriage restoring means is effective; a slide having a first and a second position and operative in its second position to prevent operation of said first control key; means holding said slide in its first position when said carriage is in its home position; means moving said slide to its second position in response to movement of said carriage from its home position, and a second operation control key operative to disable said carriage restoring means and to place said slide in its first position.

7. In a calculating machine having a plurality of numerical keys, a totalizer, a pin carriage having a home position, a plurality of pins disposed in said carriage each having a first and a second position, and means for stepping said carriage away from home position in response to operation of a numerical key, the combination comprising: carriage restoring means operative during a machine cycle to return said carriage to its home position; first pin restoring means operative during return of said carriage to its home position; second pin restoring means; a total key; means operative in response to operation of said total key to operate said second pin restoring means before said carriage restoring means is operated; total key blocking means responsive to the position of said carriage adapted to prevent operation of said total key when said carriage is displaced from its home position, a repeat key operative to disable said carriage restoring means during machine cycles initiated by said repeat key and to disable said total key blocking means, and means maintaining said total key blocking means disabled at the end of a cycle of operation initiated by said repeat key.

8. A calculating machine comprising in combination: a plurality of numerical keys, a pin carriage movable from a home position in response to the operation of a numerical key and including a plurality of pins each movable from a first to a second position in response to the operation of a numerical key, a first cycle initiating member, a slide having a first and a second position and adapted when in its second position to prevent operation of said first member, means holding said slide in its first position when said carriage is in its home position, means urging said slide toward its second position when said carriage is displaced from its home position, carriage restoring means operative during a machine cycle to return said carriage to its home position, a second cycle initiating member operative to disable said carriage restoring means and to place said slide in its first position, a third cycle initiating member, a lever settable to a first or a second position, and means operative to cause an amount entering cycle of operation in response to operation of said third member when said lever is in its first position and said slide is in its second position and to cause a totaling cycle of operation in response to operation of said third member when said lever is in its first position and said slide is in its first position.

9. In a ten key calculating machine having means to drive it through cycles of operation, a pin carriage having a home position, and a plurality of pins in said carriage each having a first and a second position, the combination comprising: a first control member operable to initiate a machine cycle; a second control member manually settable to a first or a second position; a third control member; means moving said third member from a first position to a second position in response to movement of said carriage from its home position; means responsive to operation of said first member when said second member is in its first position to cause an amount entering cycle of operation; means responsive to operation of said first member when said second member is in its second position and said third member is in its first position to cause a totaling cycle of operation and when said second member is in its second position and said third member is in its second position to cause an amount entering cycle of operation; and a fourth control member operable to initiate a machine cycle and to move said third member to its first position.

10. A calculating machine comprising in combination: a plurality of numerical keys, a carriage having a home position, means moving said carriage away from its home position in response to operation of each of said keys, a totalizer, a plurality of add racks engageable with said totalizer, a plurality of settable members disposed in said carriage and movable from first to second positions in response to operation of said keys and adapted when in their second positions to limit the movement of said racks, carriage restoring means operative to drive said carriage to its home position, means operating during return of said carriage to its home position to restore said members to their first positions, a first control key operable to establish an amount entering cycle of operation and to disable said carriage restoring means, a second control key, a control member having a first and a second position and adapted when in its second position to prevent operation of said second control key, means holding said control member in its first position when said carriage is in its home position, means moving said control member to its second position when said carriage moves from its home position, means operative in response to operation of said second key to restore each of said settable members to their first positions before said carriage restoring means operates; means moving said control member to its first position in response to operation of said first control key, latch means holding said control member in its first position following operation of said first control key, and means releasing said latch means when said carriage returns to its home position.

11. A calculating machine as defined in claim 10 and including a lever settable to a first or a second position, a third operation control key, means initiating an amount entering cycle of operation in response to operation of said third key when said lever is in its first position, and means controlled by said control member and said lever operative to cause a total-taking cycle of operation to occur in response to operation of said third control key when said control member is in its first position and said lever is in its second position and to cause an amount entering cycle of operation to occur in response to operation of said third key when said control member is in its second position and said lever is in its second position.

12. A calculating machine comprising in combination: a pin carriage having a home position; a plurality of pins disposed in said carriage each having a first and a second position; a plurality of numerical keys each operable to move one of said pins from its first to its second position; means moving said carriage from its home position in response to operation of each of said keys; carriage restoring means adapted to move said carriage to its home position during the second half of a machine cycle; first stationary pin restoring means operative as said carriage is moved to its home position to restore each of said pins to its first position; a totalizer; a plurality of add racks engageable with said totalizer and with said pins when in their said second positions; a total key; a repeat key; means responsive to the operation of said repeat key for disabling said carriage restoring means; second movable pin restoring means having a first position and operable upon movement to a second position to restore each of said pins to its first position; means responsive to the operation of said total key to move said second pin restoring means to its second position during the first half of a machine cycle; a control member having a first position and second position and adapted when in its second position to prevent operation of said total key; means urging said member toward its second position; means holding said member in its first position when said carriage is in its home position and releasing said member for movement to its second position when said carriage is moved from its home position; means moving said member to its first position in response to operation of said repeat key; latch means adapted to hold said member in its first position following operation of said repeat key; and means disabling said latch means when said carriage is in its home position.

13. In a ten key calculating machine having a carriage movable from a home position in response to the operation of numerical keys and including a plurality of elements in said carriage movable from first positions in response to the operation of the numerical keys, the combination comprising: cycle initiating means adapted to initiate an amount entering cycle of operation and a totaling cycle of operation, means including a main drive assembly adapted to perform a single cycle of operation for the performance of an amount entering operation and to perform a single cycle of operation for the performance of a totaling operation in response to the operation of said cycle initiating means, and element restoring means adapted to restore said elements to their first positions during the early portion of a totaling cycle of operation and to restore said elements to their first positions near the end of an amount entering cycle of operation.

References Cited in the file of this patent

UNITED STATES PATENTS

| | | |
|---|---|---|
| 2,424,359 | Liljestrom | July 22, 1947 |
| 2,883,105 | Grobl | Apr. 21, 1959 |
| 2,935,254 | Plunkett | May 3, 1960 |